United States Patent
Freericks et al.

(10) Patent No.: US 8,918,865 B2
(45) Date of Patent: Dec. 23, 2014

(54) SYSTEM AND METHOD FOR PROTECTING DATA ACCESSED THROUGH A NETWORK CONNECTION

(75) Inventors: Helmuth Freericks, Palm Beach Gardens, FL (US); Oleg Kouznetsov, Tequesta, FL (US); John C. Sharp, Tequesta, FL (US)

(73) Assignee: WONTOK, Inc., Palm Beach Gardens, FL (US)

( * ) Notice: Subject to any disclaimer, the term of this patent is extended or adjusted under 35 U.S.C. 154(b) by 1121 days.

(21) Appl. No.: 12/357,021

(22) Filed: Jan. 21, 2009

(65) Prior Publication Data
US 2009/0187763 A1   Jul. 23, 2009

Related U.S. Application Data

(60) Provisional application No. 61/022,709, filed on Jan. 22, 2008.

(51) Int. Cl.
*H04L 29/06* (2006.01)
*H04L 29/08* (2006.01)
*G06F 21/54* (2013.01)
*G06F 21/57* (2013.01)

(52) U.S. Cl.
CPC .............. *H04L 67/34* (2013.01); *G06F 21/54* (2013.01); *G06F 21/57* (2013.01); *H04L 63/0428* (2013.01); *H04L 63/14* (2013.01); *H04L 63/168* (2013.01)
USPC .............................................. 726/22; 726/27

(58) Field of Classification Search
CPC ........................... G06F 21/00; H04L 29/06911
USPC ............................................ 726/22, 27
See application file for complete search history.

(56) References Cited

U.S. PATENT DOCUMENTS

| 6,178,244 | B1 * | 1/2001 | Takeda et al. ................. 380/277 |
| 6,732,279 | B2 | 5/2004 | Hoffman |
| 6,772,345 | B1 | 8/2004 | Shetty |
| 6,866,581 | B2 | 3/2005 | Martinek et al. |
| 6,871,192 | B2 | 3/2005 | Fontana et al. |
| 6,968,462 | B2 | 11/2005 | Challener et al. |
| 7,080,407 | B1 | 7/2006 | Zhao et al. |
| 7,086,086 | B2 | 8/2006 | Ellis |
| 7,181,415 | B2 * | 2/2007 | Blaser et al. ................ 705/14.54 |

(Continued)

OTHER PUBLICATIONS

GreenBorder Pro 2.9 Article—Reviews by PC Magazine (PCMAG.com).

*Primary Examiner* — Jeffrey Pwu
*Assistant Examiner* — Thong Truong
(74) *Attorney, Agent, or Firm* — Fox Rothschild LLP; Robert J. Sacco, Esq.

(57) ABSTRACT

Systems (100) and methods (400) for protecting data accessed through a network connection. The methods involve transferring security software (150) from an external memory device of a client computer (102) to an internal memory device of the client computer. The security software is operative to protect data communicated to and from the client computer via communication links. The security software is also operative to provide a web browser ($110_1$, $110_2$, ..., $110_p$) which executes in user mode on a trusted secured desktop (904) configured to run simultaneously with an unsecured desktop (902) of the client computer. The security software is further operative to provide a security service to the web browser. The security service includes at least one service selected from the group consisting of a keylogger prevention service, a code injection prevention service, and a screen scraper protection service.

41 Claims, 15 Drawing Sheets

(56) References Cited

U.S. PATENT DOCUMENTS

| | | |
|---|---|---|
| 7,269,851 B2 | 9/2007 | Ackroyd et al. |
| 7,353,533 B2 | 4/2008 | Wright et al. |
| 7,418,504 B2 | 8/2008 | Larson et al. |
| 7,478,420 B2 | 1/2009 | Wright et al. |
| 7,516,476 B1 | 4/2009 | Kraemer et al. |
| 7,827,611 B2 | 11/2010 | Kouznetsov et al. |
| 2002/0029342 A1 | 3/2002 | Keech |
| 2002/0166063 A1 | 11/2002 | Lachman et al. |
| 2003/0037142 A1* | 2/2003 | Munger et al. ............... 709/225 |
| 2003/0079143 A1 | 4/2003 | Mikel et al. |
| 2003/0120605 A1 | 6/2003 | Fontana et al. |
| 2003/0131249 A1 | 7/2003 | Hoffman |
| 2003/0159070 A1 | 8/2003 | Mayer et al. |
| 2003/0177389 A1 | 9/2003 | Albert et al. |
| 2004/0034794 A1 | 2/2004 | Mayer et al. |
| 2004/0123153 A1 | 6/2004 | Wright et al. |
| 2004/0249974 A1 | 12/2004 | Alkhatib et al. |
| 2005/0055578 A1 | 3/2005 | Wright et al. |
| 2005/0071282 A1 | 3/2005 | Lu et al. |
| 2005/0138395 A1 | 6/2005 | Benco et al. |
| 2005/0149726 A1 | 7/2005 | Joshi et al. |
| 2005/0172015 A1 | 8/2005 | Rana et al. |
| 2005/0183143 A1 | 8/2005 | Anderholm et al. |
| 2005/0216957 A1 | 9/2005 | Banzhof et al. |
| 2005/0229250 A1 | 10/2005 | Ring et al. |
| 2006/0010252 A1 | 1/2006 | Miltonberger et al. |
| 2006/0031940 A1 | 2/2006 | Rozman et al. |
| 2006/0036731 A1 | 2/2006 | Mossman et al. |
| 2006/0064755 A1 | 3/2006 | Azadet et al. |
| 2006/0090196 A1 | 4/2006 | van Bemmel et al. |
| 2006/0101128 A1 | 5/2006 | Waterson |
| 2006/0101282 A1 | 5/2006 | Costea et al. |
| 2006/0130141 A1 | 6/2006 | Kramer et al. |
| 2006/0143706 A1 | 6/2006 | Kawasaki et al. |
| 2006/0206936 A1 | 9/2006 | Liang et al. |
| 2006/0224753 A1 | 10/2006 | Hama et al. |
| 2006/0236391 A1 | 10/2006 | Kim et al. |
| 2006/0259967 A1 | 11/2006 | Thomas et al. |
| 2006/0265761 A1* | 11/2006 | Rochette et al. ............... 726/27 |
| 2007/0011741 A1 | 1/2007 | Robert et al. |
| 2007/0022287 A1 | 1/2007 | Beck et al. |
| 2007/0036300 A1 | 2/2007 | Brown et al. |
| 2007/0055711 A1 | 3/2007 | Polyakov et al. |
| 2007/0067833 A1 | 3/2007 | Colnot |
| 2007/0094496 A1 | 4/2007 | Burtscher |
| 2007/0101435 A1* | 5/2007 | Konanka et al. ............... 726/27 |
| 2007/0162975 A1 | 7/2007 | Overton et al. |
| 2007/0182714 A1* | 8/2007 | Pemmaraju ............... 345/168 |
| 2007/0234061 A1 | 10/2007 | Teo |
| 2007/0240212 A1 | 10/2007 | Matalytski |
| 2007/0245343 A1 | 10/2007 | Shannon et al. |
| 2007/0271189 A1 | 11/2007 | Morten et al. |
| 2008/0016339 A1 | 1/2008 | Shukla |
| 2008/0034419 A1 | 2/2008 | Mullick et al. |
| 2008/0040797 A1* | 2/2008 | Schwartz et al. ............... 726/19 |
| 2008/0040800 A1* | 2/2008 | Park ............... 726/22 |
| 2009/0037976 A1 | 2/2009 | Teo et al. |
| 2009/0044266 A1 | 2/2009 | Sharp et al. |
| 2009/0187991 A1 | 7/2009 | Freericks et al. |

* cited by examiner

Go to FIG. 4B

SYSTEM AND METHOD FOR PROTECTING DATA ACCESSED THROUGH A NETWORK CONNECTION

CROSS REFERENCE TO RELATED APPLICATIONS

This non-provisional U.S. patent application claims the benefit of U.S. Provisional Patent Application No. 61/022,709 entitled "SYSTEM AND METHOD FOR PROTECTING DATA ACCESSED THROUGH A NETWORK CONNECTION" filed on Jan. 22, 2008 by inventors Helmuth Freericks, Oleg Kouznetsov, and John C. Sharp.

BACKGROUND OF THE INVENTION

1. Statement of the Technical Field

The present invention relates generally to the security of data accessed on networks. More particularly, the present invention relates to agent based software used as a service to secure data accessed by a client computer and communicated to/from a host computer via a network.

2. Description of the Related Art

As most people now use and store data on the Internet for financial and recreational purposes, there is an increasing need to ensure a high level of security. Such security much be sufficiently robust so as to permit users to perform using/storing (e.g., reading/writing) operations while preventing data from being compromised by hackers and malware. Conventional computer security software is typically reactive in nature, and therefore requires regular updates. As such, there exists the possibility that hackers, viruses, spyware, malware, and malicious software may penetrate defenses put in place to protect an end user from harm. Such harm may include, but is not limited to, an unauthorized use of resources on a users computer by a third party, the collection of private data from a user by a third party, and the prevention of normal operations of an end user-device.

Prevention of such threats poses a very serious problem for computer security software vendors. The problem is due to the increasing complexity of threats to which end user devices are exposed. The security systems that are provided by conventional computer security software vendors address certain aspects of the overall security requirements and typically assume that a computer is protected by traditional anti-virus or anti-malware solutions. As such, there is a need for a system that facilitates comprehensive protection of data communicated between computers via a network (e.g., the Internet).

SUMMARY

This summary is provided to comply with 37 C.F.R. §1.73, presenting a summary of the invention briefly indicating the nature and substance of the invention. It is submitted with the understanding that it will not be used to interpret or limit the scope or meaning of the claims.

Embodiments of the present invention concern methods for protecting data accessed through a network connection. The methods involve transferring security software from an external memory device of a client computer to an internal memory device of the client computer. The security software is operative to protect data communicated to and from the client computer via at least one communications link by providing at least one web browser which executes in user mode on a trusted secure desktop. The trusted secure desktop is operative to run simultaneously with an unsecure desktop of the client computer.

The security software is also operative to protect the data communicated to and from the client computer via the communications link by providing at least one security service to the web browser. The security service includes a keylogger prevention service, a code injection prevention service, a process protection service, and/or a screen scraper protection service. The security service is provided by the trusted secure desktop, an underlying user mode software operative to communicate with the trusted secure desktop, and/or an underlying kernel mode software operative to communicate with the underlying user mode software and an operating system of the client computer.

According to an aspect of the present invention, the methods also involve establishing a first secure communications link between the client computer and a first network site system. The first network site system is provided by a first business organization offering a network based service for protecting the data accessed through the network connection. The methods further involve establishing a second secure communications link between the client computer and a second network site system. The second network site system is provided by a second business organization different from the first business organization. Data is encrypted prior to being communicated to and from the first network site system, the second network site system, and the client computer via a respective one of the first and second secure communication links.

According to another aspect of the present invention, the methods involve receiving a domain name resolution request (generated at the client computer) at the first network site system for obtaining a secure numerical identifier associated with networking equipment of the second network site system. The methods also involve performing a domain name resolution at the first network site system to translate a domain name to the secure numerical identifier associated with the networking equipment for purposes of locating and addressing the networking equipment. Thereafter, the secure numerical identifier is communicated to the client computer over a secure communications link established between the first network site system and the client computer. The secure numerical identifier can be encrypted prior to being communicated from the first network site system to the client computer.

According to another aspect of the present invention, the methods involve accessing a configuration file stored in the internal memory device of the client computer. The configuration file includes domain-name-to-secure-numerical-identifier resolution information. A secure numerical identifier is obtained from the configuration file. A resource request is then generated at the client computer for a resource of a network site system using the obtained secure numerical identifier. The resource request is communicated from the client computer to the network site system via a secure communications link.

According to another aspect of the present invention, the methods involve creating a user profile identifying at least one network site system to which a user of the client computer wants to securely link and exchange information with. The methods also involve storing the web browser on the client computer in an encrypted form and decrypting the web browser prior to executing the web browser on the trusted secure desktop.

The keylogger prevention service is provided by: temporarily breaking all connections between an operating system of the client computer and first keyboard device drivers of the client computer; and establishing a connection between the operating system and a second keyboard device driver that has been verified to be an unpatched or untampered keyboard device driver. The keylogger prevention service can further be provided by: intercepting at least one function used to patch memory images of the second keyboard device driver; and preventing the function from succeeding if the function is determined to be used by malware.

The code injection prevention service is provided by: monitoring code injection functions being performed by the client computer; and preventing one or more of the code injection functions from succeeding if the code injection function is determined to be used by malware. The screen scraper protection service is provided by: monitoring functions performed by the client computer used to intercept or redirect information communicated to and from a keyboard, a mouse, and a display screen; intercepting the functions; and preventing one or more of the functions from succeeding if the functions are non-display screen functions and are determined to be used by malware. The screen scraper protection service is also provided by: monitoring functions performed by the client computer used to intercept or redirect information communicated to and from a keyboard, a mouse, and a display screen; intercepting the functions; and performing the functions against a screen size of a height of zero pixels and a width of zero pixels if the functions are display screen functions and are determined to be used by malware.

According to another aspect of the present invention, the methods involve scanning program data stored in the internal memory device of the client computer associated with user mode and kernel mode applications running on the unsecure desktop for malware prior to launching the trusted secure desktop. The trusted secure desktop and/or the web browser is prevented from launching if the program data includes malware. An anti-virus/spyware software can be run on the unsecure desktop to identify and remove the malware from the client computer. After the malware has been removed from the client computer, the trusted secure desktop and the web browser application are allowed to be launched.

A mini-stack application can be provided that is operative to display a borderless browser window on a display screen of the client computer. The borderless browser window can include an element facilitating a user-software interaction for establishing a secure communications link between the client computer and at least one network site. The mini-stack application is protected at least by an underlying user and kernel mode software against tampering by hackers and malware. The mini-stack application can facilitate the gathering of information. The information can include, but is not limited to, software usage information, network site selection information, and advertisement information identifying advertisements clicks on by a user of the client computer. The gathered information can be stored in a storage device of a network system site.

Embodiments of the present invention also concern network based systems for protecting data accessed by a computer system through a network connection. The network based systems generally implement the above described methods. In this regard, the network based systems include a first network site system offering a network based service for protecting the data accessed through the network connection. The first network site system is configured for transferring security software from the external memory device of the client computer to the internal memory device of the client computer. The first network site system is also configured for establishing a first secure communications link with the client computer and establishing a second secure communications link between the client computer and the second network site system. Data can be encrypted prior to being communicated to and from the first network site systems, the second network site systems, and the client computer via a respective one of the first and second secure communications links. The second network site system can be selected from a secure index or directory provided by the first network site system. The second network site system can be, but is not limited to, a banking network site system, a law firm intranet network site system, a government intranet network site system, a stock trading network site system, or a social data exchange network site system.

According to an aspect of the present invention, the first network site system is also configured for receiving a domain name resolution request from the client computer for obtaining a secure numerical identifier associated with networking equipment of the second network site system. Upon receipt of the resolution request, the first network site system performs a domain name resolution to translate a domain name to the secure numerical identifier associated with the networking equipment for purposes of locating and addressing the networking equipment. Thereafter, the secure numerical identifier is communicated to the client computer over a secure communications link established between the first network site system and the client computer. The secure numerical identifier can be encrypted prior to being communicated to the client computer.

According to another aspect of the present invention, the first network site system is configured for transferring the configuration file from the first memory device to the second memory device of the client computer. As noted above, the configuration file includes domain-name-to-secure-numerical-identifier resolution information.

According to yet another aspect of the present invention, the first network site system is configured for generating a user profile identifying at least one network site system to which a user of the client computer wants to securely link and exchange information with. The first network site system is also configured for encrypting the web browser prior to transferring the security software to the client computer.

Embodiments of the present invention also concern network based systems including at least one client computer and at least one server computer. The server computer is provided by a first business organization offering a network based service for protecting data accessed through a network connection. The server computer is configured for receiving a security software download request from the client computer, obtaining files for the security software, and communicating the files to the client computer. The server computer is also configured for communicating with the client computer via a first secure communication link established between the server computer and the client computer. The server computer is further configured for performing a domain name resolution to translate a domain name to a secure numerical identifier associated with a second network site system for purposes of locating and addressing the second network site system. The second network site system is provided by a second business organization different from the first business organization. The secure numerical identifier is communicated to the client computer over the first secure communications link. The server computer also facilitates a second secure communications link between the client computer and the second network site system.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. Capital letters are used throughout this document. All uses of the capital letters should be given the same meaning as those represented in a non-capital letter format and can be freely exchanged. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Figure 1:
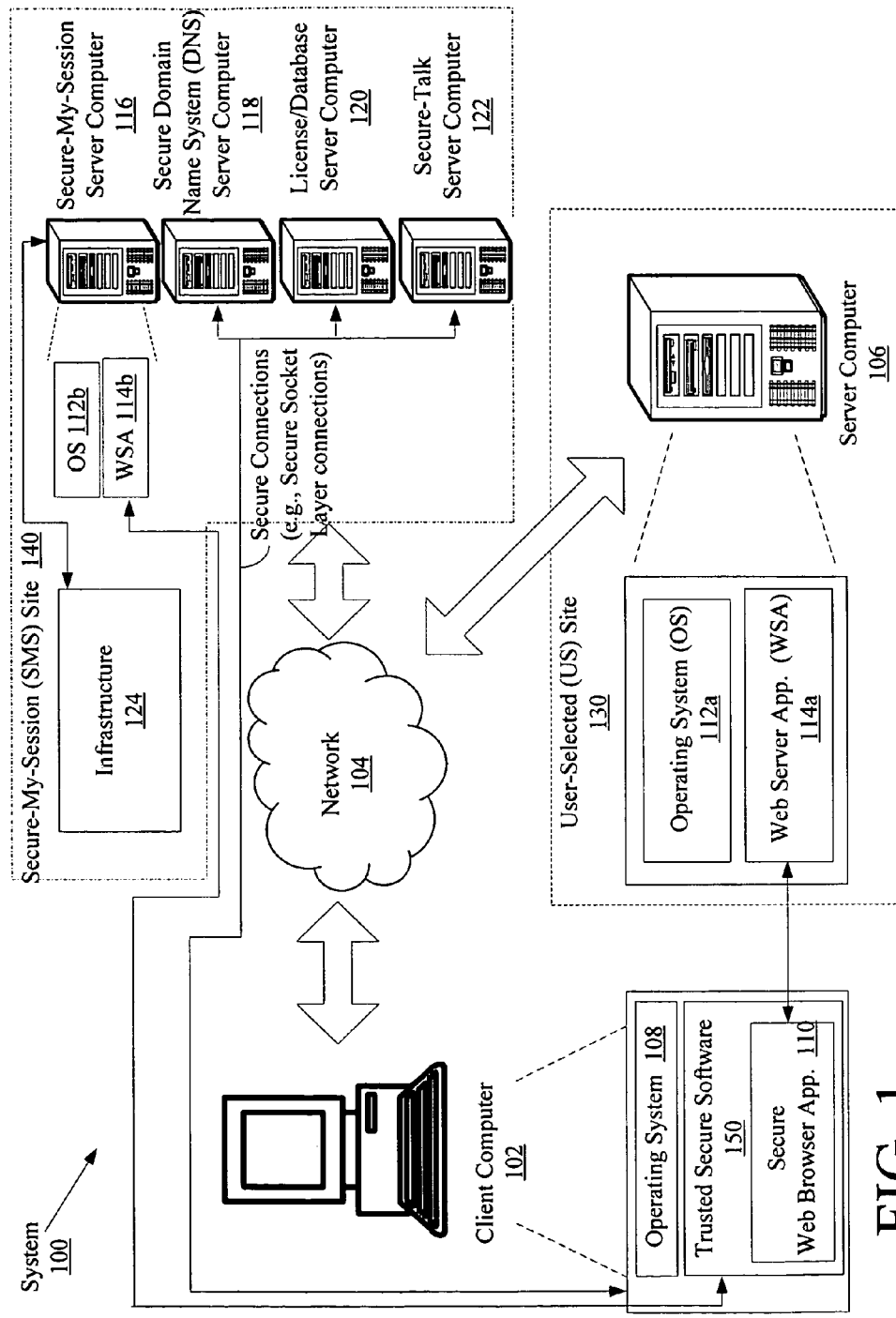
FIG. 1 is a block diagram of an exemplary system configured according to an embodiment of the present invention.

Referring now to FIG. 1, there is provided a schematic illustration of a system 100 for protecting data accessed through a network connection according to an embodiment of the present invention. As shown in FIG. 1, the system 100 comprises a client computer 102, a network 104, a Secure-My-Session (SMS) site 140, and a User-Selected (US) site 130. The SMS site 140 includes a plurality of server computers 116, 118, 120, 122 and other infrastructure 124. The infrastructure 124 can include, but is not limited to, Virtual Private Network (VPN) server computers. VPNs are well known to those having ordinary skill in the art, and therefore will not be described herein. The US site 130 includes a server computer 106.

The components 116, 118, 120, 122, 124 of the SMS site 140 provide web, licensing, database, and communications infrastructure to the system 100. In this regard, it should be understood that the SMS server computer 116 runs a specific server application which is divided among the server computers 116, 118, 120, 122. The server application is generally operative to provide a secure session in which requests are accepted from a user agent (e.g., a Secure Web Browser Application 110) of the client computer 102 and responses are served to the user agent along with optional data content (e.g., web pages, images, etc . . . ). The SMS server computer 116 can also include content identifying a main landing page for the user agent (e.g., a Secure Web Browser Application 110) of the client computer 102.

The Secure Domain Name System (DNS) server computer 118 communicates with the client computer 102 via a secure connection (or a secure communication link) established therebetween. The secure connection can be, but is not limited to, a Secure Socket Layer (SSL) connection. SSL connections are well known to those having ordinary skill in the art, and therefore will not be described herein. The Secure DNS server computer 118 can also receive encoded DNS requests from the client computer, decode the received encoded DNS requests, and process the decoded DNS requests for obtaining secure Internet Protocol (IP) addresses for network equipment of network sites (e.g., the US site 130). The Secure DNS server computer 118 can further securely resolve Internet links and Internet Protocol addresses. In this regard, the Secure DNS server computer 118 provides a hierarchical naming system for computers, services, or any resource participating in a Secure-My-Session (SMS) based network. The hierarchical naming system associates various information with domain names assigned to the participants of the SMS based network. Accordingly, the Secure DNS server computer 118 translates human meaningful domain names to numerical (e.g., binary) identifiers associated with networking equipment for purposes of locating and addressing the networking equipment of the system 100.

The License/Database server computer 120 communicates with the client computer 102 via a secure connection (or a secure communication link) established therebetween. The secure connection can be, but is not limited to, an SSL connection. The License/Database server computer 120 also validates user licenses and stores user data. The License/Database server computer 120 includes user profiles identifying network sites to which a user of the client computer 102 would like to securely link and exchange data with.

The Secure-Talk server computer 122 communicates with the client computer 102 via a secure connection (or a secure communication link) established therebetween. The secure connection can be, but is not limited to, an SSL connection. The Secure-Talk server computer 122 also generally enables secure communications of information from the SMS site 140 to the client computer 102. Similarly, the Secure-Talk computer 122 enables secure communications of information from the client computer 102 to the SMS site 140. The secure communications can be provided by the encryption of information to be communicated from SMS site 140 to the client computer 102, and vice versa. The Secure-Talk server computer 122 further enable secure communications of information from the server computer 106 of the US site 130 to the client computer 102. Likewise, the Secure-Talk server computer 122 enables secure communications of information from the client computer 102 to the server computer 106 of the US site 130. For example, the client computer 102 communicates information to the Secure-Talk server computer 122 via a secure link. In turn, the Secure-Talk server computer 122 communicates the received information to the server computer 106 of the US site 130 via a secure link established therebetween. The secure communications can be provided by the encryption of information to be communicated from the server computer 106 of the US site 130 to the client computer 102, and vice versa. Methods for encrypting data are well known to those having ordinary skill in the art, and therefore will not be described herein. However, it should be understood that any data encryption method can be used without limitation.

Each of the computers 102, 106, 116, 118, 120, 122 can operate as a single standalone device or can be connected (e.g., using the network 104) to other computing devices to perform various tasks in a distributed fashion. Each of the computers 102, 106, 116, 118, 120, 122 can comprise various types of computing systems and devices, including a personal computer (PC), a tablet PC, a laptop computer, a desktop computer, or any other device capable of executing a set of instructions (sequential or otherwise) that specifies actions to be taken by that device. It is to be understood that a device of the present disclosure also includes any electronic device that provides voice, video or data communication. Further, while a single client computer 102 is illustrated in FIG. 1, the phrases "client computer" and "computer system" shall be understood to include any collection of computing devices that individually or jointly execute a set (or multiple sets) of instructions to perform any one or more of the methodologies discussed herein.

The computer systems 102, 106, 116, 118, 120, 122 are communicatively coupled to one another through respective connections to the network 104. According to an embodiment of the present invention, the network 104 comprises an Internet. However, it should be appreciated that the network 104 can also comprise a Local Area Network (LAN), a Wide Area Network (WAN), or any other suitable network for connecting the computers 102, 106, 116, 118, 120, 122.

The computer systems 102, 106, 116, 118, 120, 122 can be any multimode communication device capable of supporting wire line and/or wireless communication technologies. Such multimode communication devices include, but are not limited to, cell phones, personal computers, laptops, and personal digital assistants. In the case of wire line communications, the computer systems 102, 106, 116, 118, 120, 122 can utilize xDSL, cable, or public switch telephone network (PSTN) telephony interfaces for communicating over the network 104, which can include hybrid technologies that support circuit-switched packet-switched communications. The computer systems 102, 106, 116, 118, 120, 122 can also support accessory interfaces (e.g., universal serial buses, Firewires, and other connectivity technologies).

The computer systems 102, 106, 116, 118, 120, 122 can further support any number of wireless communication protocols. Such communication protocols include, but are not limited to, 802.xx protocols defined by the Institute of Electrical and Electronics Engineers (IEEE). For instance, the computer systems 102, 106, 116, 118, 120, 122 can utilize long-range wireless access technologies (e.g., cellular, software defined radio and WiMAX) and/or short-range wireless technologies to communicate with the network 104. Cellular access technologies include, but are not limited to, CDMA-1X, UMTS/HSDPA, GSM/GPRS, TDMA/EDGE, EV/DO, and next generation technologies as they emerge. Short-range wireless technologies include, but are not limited to, WiFi, Bluetooth, Zigbee, and cordless communications (e.g., digital enhanced cordless telecommunications).

A number of software components utilized by the computer systems 102, 106, 116, 118, 120, 122 are shown in FIG. 1. In particular, the client computer 102 includes an operating system 108 for controlling the operation of a networked desktop or laptop computer. Similarly, each of the server computers 106 and 116 includes an operating system 112*a*, 112*b* for controlling the operation of a networked server computer. Operating systems are well known to those having ordinary skill in the art, and therefore will not be described herein. However, it should be understood that any operating system can be employed by the computers 102, 106, 116.

The client computer 102 also includes Trusted Secure software 150 with a Secure Web Browser application 110 (also referred to herein as a "Secure Browser") that has been downloaded from a particular vendor's network site. The term "download", as used herein, refers a process to transfer files from a first computer to a second computer via a network. The Trusted Secure software 150 is generally operative to provide a Secure Desktop environment from which other applications and programs can be launched while being fully protected against tampering and monitoring by malware. This malware protection is facilitated by registry key protection, kernel mode level file protection, code injection protection, running process protection, and screen scraper protection. The Secure Browser 110 is generally operative to establish a connection with a web server application executing on a server computer, request information from the server computer through the network connection, receive the requested information from the server computer through the connection, and process the received information. The Trusted Secure software 150 and Secure Browser 100 will be described in detail below in relation to FIG. 3.

The client computer 102 can access the SMS site 140 after launching at least a portion of the Trusted Secure software 150 and the Secure Browser 110. Once the client computer 102 has accessed the SMS site 140, the client computer 102 communicates with one or more servers thereof to establish a secure session therewith and access a previously created user profile identifying one or more network site systems (e.g., the US site 130) selected from a secure index or directory to which a user of the client computer 102 would like to securely link and exchange data with. The network site systems are selected from a secure index or directory provided by the SMS site 140. The network site systems selected from the secure index or directory include, but are not limited to, banking network site systems, law firm intranet network site systems, government intranet network site systems, stock trading network site systems, social data exchange network site systems, and other network site systems providing access to confidential information. More particularly, the Secure Browser 110 can establish a connection with an application (not shown) executing on the License/Database server computer 120, request network site systems information included in a user profile from the License/Database server computer 120, and select a network site systems from the user profile to which a secure link is to be established. It should be noted that the provision of the secure index/directory and user profile ensures that the client computer will access an actual resource (e.g., a webpage) of a non-malicious network site system (e.g., a US site 130) rather than a malicious resource (e.g., webpage) of a malicious network site system.

After selecting a network site system to which a secure link is to be established, the Secure Browser 110 is generally operative to establish a secure connection (or secure communication link) with the server computer 106 through a secure link therewith. The Secure Browser 110 can also request resources (e.g., web pages) from the server computer 106 through the secure connection, receive content (e.g., HTML content) from the server computer 106 through the secure connection, and execute the content (e.g., display a web page to a user of the client computer 102). The term "resource", as used herein, refers to every thing or entity that can be identified, named, addressed or handled, in any way whatsoever, in the World Wide Web (WWW) at large, or in any networked information system.

As should be understood, a resource can require a user authentication. After a user (not shown) has been authenticated, a session is initiated. The user authentication typically involves obtaining confidential data from the user (not shown) of the client computer 102, communicating the confidential data (e.g., a user identification and/or a password) to the server computer 106, and verifying at the server computer 106 the users identity using the confidential data. The Secure Browser 110 will be described in more detail below in relation to FIG. 3.

As shown in FIG. 1, the Secure Browser 110 is also generally operative to establish a network connection with a web server application 114a executing on the server computer 106 through a communication link therewith. The Secure Browser 110 also requests resources (e.g., web pages) from the server computer 106 through the network connection, receives content (e.g., HTML content) from the server computer 106 through the network connection, and executes the content (e.g., display a web page to a user of the client computer 102).

Figure 2:
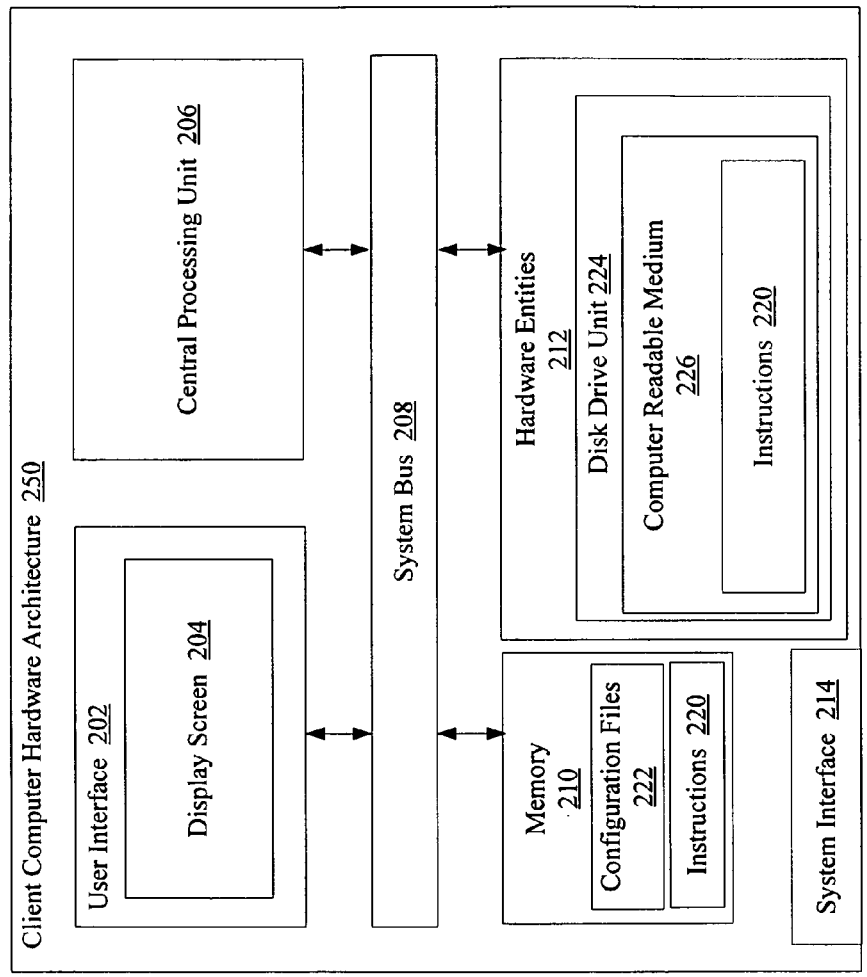
FIG. 2 is a block diagram of an exemplary hardware architecture for the client computer shown in FIG. 1.

Referring now to FIG. 2, there is provided a block diagram of an exemplary hardware architecture 250 for the client computer 102. As shown in FIG. 2, the hardware architecture 250 comprises a system interface 214, a user interface 202, a central processing unit 206, a system bus 208, a memory 210 connected to and accessible by other portions of client computer 102 through system bus 208, and hardware entities 212 connected to system bus 208. Memory 210 can include configurations files 222. The configuration files 222 can include DNS information, such as domain-name-to-Internet-Protocol (IP) address resolution information. At least some of the hardware entities 212 perform actions involving access to and use of memory 210, which may be a random access memory (RAM), a disk driver, and/or a compact disc read only memory (CD-ROM).

User interface 202 is comprised of input devices, output devices, and software routines configured to allow a user to interact with and control software applications installed on the client computer 102. Such input and output devices include, but are not limited to, a display screen 204, a speaker (not shown), a keypad (not shown), a directional pad (not shown), a directional knob (not shown), and a microphone (not shown). As such, user interface 202 can facilitate a user-software interaction for launching web browser applications and other types of applications installed on the client computer 102.

System interface 214 allows the client computer 102 to communicate directly or indirectly with one or more sever computers 106, 116, 118, 120, 122, 124 (described above in relation to FIG. 1). If the client computer 102 is communicating indirectly with the server computers 106, 116, 118, 120, 122, 124, then the client computer 102 is sending and receiving communications through the common communications network 104.

Hardware entities 212 may include microprocessors, application specific integrated circuits (ASICs), and other hardware. Hardware entities 212 may include a microprocessor programmed for providing a Secure Desktop (e.g., a Secure Desktop 904 of FIG. 9). In this regard, it should be understood that the microprocessor can access and run a Trusted Secure Extensions (TSX) Core software program, a SDS software program, TSX Client Applications Secure File System software, element engine code, and/or element code installed on the client computer 102. Alternatively, the microprocessor can have the TSX Core software program, the SDS software program, the TSX Client Applications, the Secure File System software, the element engine code, and/or the element code installed thereon. The TSX Core software program, a SDS software program, TSX Client Applications Secure File System software, element engine code, and element code will be described below in relation to FIG. 3. However, it should be understood that the SDS software can include a VERO™ software program available from Authentium, Inc. of Palm Beach, Fla.

Hardware entities 212 may further include a microprocessor programmed for simultaneously displaying Unsecure Desktops (e.g., the Unsecure Desktop 902 shown in FIG. 9) and Secure Desktops (e.g., a Secure Desktop 904 of FIG. 9) to a user via the display screen 204. Hardware entities 212 may include an encryption device for encrypting data prior to communicating the same to a network site (e.g., the SMS site 140 of FIG. 1 or the US site 130 of FIG. 1) and a decryption device (not shown) for decrypting data received from the network site. Hardware entities 212 can also include a decryption device for decrypting all or a portion of the SDS software program (described below in relation to FIG. 3) prior to launching of the same. Methods for encrypting and decrypting data are well known to those having ordinary skill in the art, and therefore will not be described herein. However, it should be understood that any data encryption/decryption method can be used without limitation.

As shown in FIG. 2, the hardware entities 212 can include a disk drive unit 224 comprising a computer-readable storage medium 226 on which is stored one or more sets of instructions 220 (e.g., software code) configured to implement one or more of the methodologies, procedures, or functions described herein. The instructions 220 can also reside, completely or at least partially, within the memory 210 and/or within the CPU 206 during execution thereof by the client computer 102. The memory 210 and the CPU 206 also can constitute machine-readable media.

While the computer-readable storage medium 226 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Figure 3:
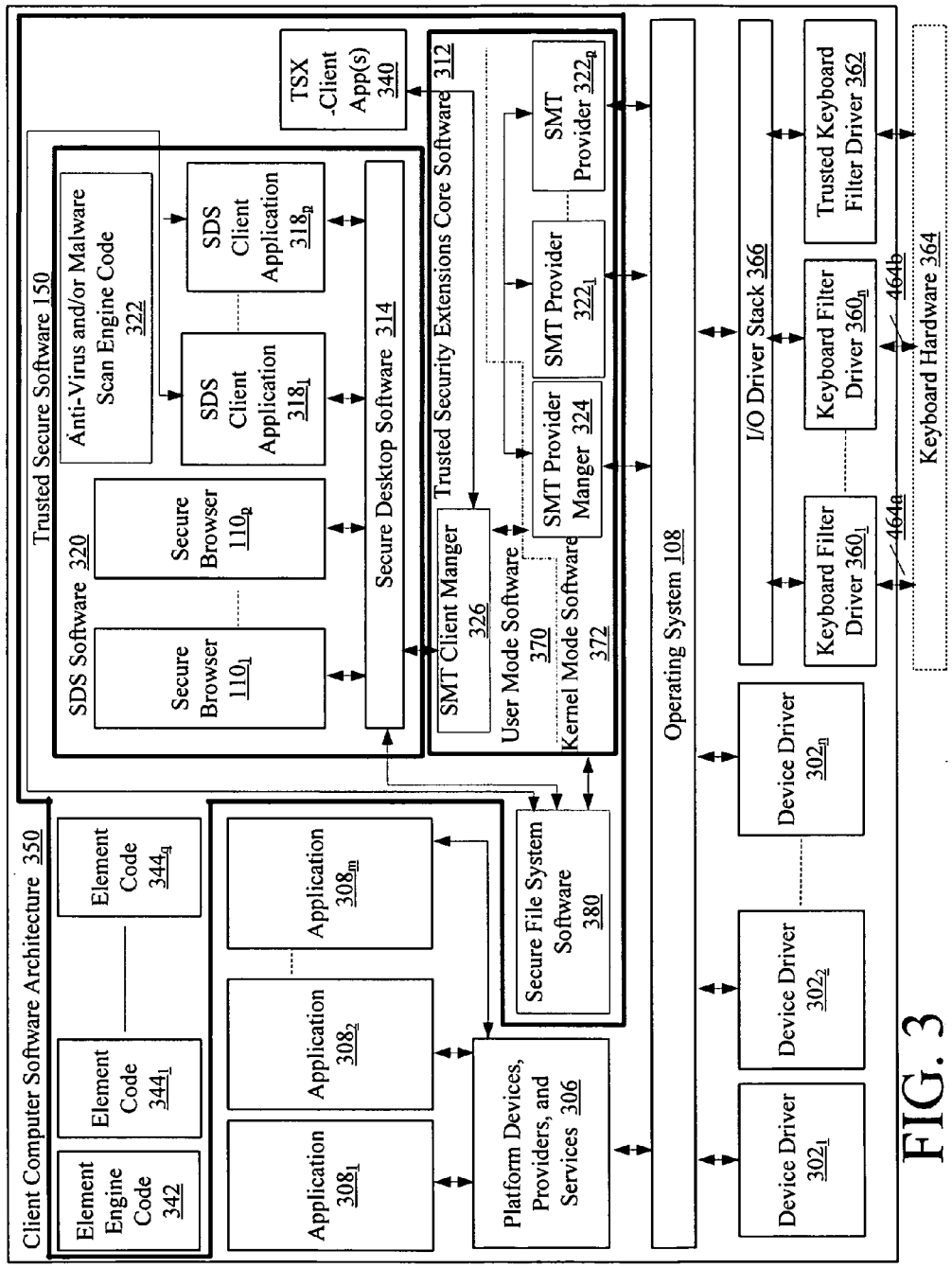
FIG. 3 is a block diagram of an exemplary software architecture for the client computer shown in FIG. 1.

Referring now to FIG. 3, there is provided an exemplary software architecture 350 for the client computer 102. As shown in FIG. 3, the software architecture 350 can include levels of software programs. The software architecture 350 includes device driver software programs $302_1$, $302_2$, ..., $302_n$, keyboard filter driver software programs $360_1$, $360_2$ (not shown), ..., $360_n$, a trusted keyboard filter driver 362, an Input/Output (I/O) Driver Stack software program 366, an operating system (OS) 108, platform device/provider/service (PDPS) software programs 306, software applications $308_1$, $308_2$, ..., $308_m$, and Trusted Secure software 150. The software programs $302_1$, $302_2$, ..., $302_n$, 108, 306, $360_1$, $360_2$ (not shown), ..., $360_n$, 366 of software architecture 350 are well known to persons having ordinary skill in the art. Thus, the software programs $302_1$, $302_2$, ..., $302_n$, 108, 306, $360_1$, $360_2$ (not shown), ..., $360_n$, 366 will not be described in detail herein. However, a brief description of the software architecture 350 is provided to assist a reader in understanding the present invention.

A device driver software program $302_1$, $302_2$, ..., $302_n$ typically is software the OS 108 uses to facilitate communications between hardware components (e.g., hardware components 202, 206, 210, 212, 214 described above in relation to FIG. 2). A device driver software program $302_1$, $302_2$, ..., $302_n$ can include code for managing access to hardware components, setting hardware component parameters, and transmitting data between hardware components.

Each of the keyboard filter driver software programs $360_1$, $360_2$ (not shown), ..., $360_n$ is a particular type of device driver software program that the OS 108 uses to facilitate communications between keyboard hardware 364. Each of the keyboard filter driver software programs $360_1$, $360_2$ (not shown), ..., $360_n$ connects to the keyboard hardware 364 via a respective connection 464a, 464b. The Keyboard Filter Driver software programs $360_1$, $360_2$ (not shown), ..., $360_n$ communicate with the OS 108 via the I/O Driver Stack software program 366. The I/O Driver Stack software program 366 interfaces the OS 108, which passes key strokes to an Unsecure Desktop (e.g., the Unsecure Desktop 902 shown in FIG. 9) and applications $308_1$, $308_2$, ..., $308_m$ running on the Unsecure Desktop. As should be understood, the Unsecure Desktop can be provided by Unsecure Desktop software (not shown in FIG. 3) which is well known to those having ordinary skill in the art, and therefore will not be described herein.

The Trusted Keyboard Filter Driver software program 362 provides an anti-key logging feature to the client computer 102. If the anti-key logging feature of the client computer 102 is active, then the connections 464a and 464b are broken between the Keyboard Filter Driver software programs $360_1$, $360_2$ (not shown), ..., $360_n$ and the keyboard hardware 364. In such a scenario, only the Keyboard Filter Driver software program 362 can communicate with the OS 108 via the I/O Driver Stack software program 366. The Trusted Keyboard Filter Driver software program 362 can be, but is not limited to, a standard driver provided by a publisher of the OS 108, and thus can be verified against information published by the publisher of the OS 108.

OS 108 is system software responsible for the direct control and management of the client computer 102 hardware (e.g., hardware components 202, 206, 210, 212, 214 described above in relation to FIG. 2). Typically, OS 108 manages basic client computer system 102 operations, such as loading and running software applications. OS 108 is also system software responsible for enabling a user to control hardware coupled to the client computer system 102. OS 108 can also include instructions to install, launch, and manage applications. OS 108 is typically stored in memory (e.g., memory 210 described above in relation to FIG. 2) which may be a ROM, hard drive, or other storage device.

The PDPS software programs 306 can include a desktop configuration provider (not shown), a communications provider (not shown), and other providers/services known in the art. The desktop configuration provider (not shown) is software responsible for the direct control and management of desktop configurations. Desktop configurations are well known to those having ordinary skill in the art, and therefore will not be described herein. Software applications $308_1$, $308_2$, ..., $308_m$ typically include programs designed for end users. Software applications $308_1$, $308_2$, ..., $308_m$ are typically installed on the client computer 102.

The Trusted Secure software 150 includes TSX Core software 312, SDS software 320, TSX Client applications 340, Element Engine code 342, Element code $344_1$, $344_2$ (not shown), ..., $344_q$, and an optional Secure File System (SFS) software 380. The SFS software 380 is generally operable to store data, organize data, manipulate data, and retrieve data from a storage device (e.g., the memory 210 of FIG. 2). The SFS software 380 is generally operable to generate a list of physical locations of the computer files and data. The software 380 can also generally be operative to access and obtain data from a configuration file (e.g., the configuration file 222 of FIG. 2) stored in a storage device (e.g., memory 210 of FIG. 2) of the client computer 102. The SFS software 380 can further generally be operative to encrypt data prior to storage in a storage device (e.g., the memory 210 of FIG. 2) of the client computer 102 or prior to communication of the data to a network site (e.g., the US site 130 of FIG. 1 and the SMS site 140 of FIG. 1). In effect, the SFS software 380 provides a data security feature to the client computer 102.

The TSX Core software 312 includes user mode software 370 and kernel mode software 372. The TSX Core software 312 generally performs user event mode monitoring operations, kernel mode event monitoring operations, user mode event interception operations, and kernel mode event interception operations. The TSX Core software 312 includes System Monitor Toolkit (SMT) Client Manager software 326, SMT Provider Manager software 324, and SMT Provider software $322_1$, $322_2$ (not shown), ..., $322_p$. The SMT Client Manager software 326 is executed in user mode. The SMT software 324, $322_1$, $322_2$ (not shown), ..., $322_p$ is executed in kernel mode. The phrase "user mode", as used herein, refers to a state in which a process runs application code (e.g., end-user application code) rather than kernel code (e.g., device driver code and platform service code). The phrase "kernel mode", as used herein, refers to a state in which a process runs kernel code (e.g., device driver code, platform service code, and kernel code that allows full access to the client computer 102 system).

The SMT Provider software $322_1$, $322_2$ (not shown), ..., $322_p$ can generally be standalone software modules which execute in kernel mode while providing interception of specific kernel mode events. Each of the SMT Provider software $322_1$, $322_2$ (not shown), ..., $322_p$ respectively intercept kernel mode events that belong to the same or similar class. For example, the SMT Provider software $322_1$ is classified as File System SMT Provider software that is generally operative to intercept Network Input/Output (I/O) requests. The SMT Provider software $322_2$ is classified as a Network SMT Provider software that is generally operative to intercept network I/O requests. Embodiments of the present invention are not limited in this regard. The SMT Provider software $322_1$, $322_2$ (not shown), ..., $322_p$ can include C Libraries of Binary Interception and Instrumentation (not shown) and C Run-Time Libraries (not shown). C Libraries of Binary Interception and Instrumentation (not shown) are well known to those having ordinary skill in the art, and therefore will not be described herein. Similarly, C Run-Time Libraries (not shown) are well known to those having ordinary skill in the art, and therefore will not be described herein.

The SMT Provider Manager software 324 is a driver or other software component that executes in kernel mode while performing registration operations for registration of the SMT Provider software $322_1$, $322_2$ (not shown), ..., $322_p$ and un-registration operations for un-registration of the SMT Provider software $322_1$, $322_2$ (not shown), ..., $322_p$. The SMT Provider Manager software 324 supplies the SMT Provider software $322_1$, $322_2$ (not shown), ..., $322_p$ with a unified interface for intercepting kernel mode events, accessing a Common Information Model (CIM) library, accessing a CIM repository, delivering intercepted kernel mode events to the TSX Client applications 340, and receiving processed data about the intercepted kernel mode events from the TSX Client applications 340. The phrase "Common Information Model", as used herein, refers to an object oriented information model that provides a conceptual framework for describing management data, as specified by the Distributed Management Task Force, Inc.'s (DMTF) Common Information Model (CIM) Standard. The DMTF CIM Standard is well known to those having ordinary skill in the art, and therefore will not be described herein.

The SMT Client Manager software 326 is a service or other software component that executes in user mode while managing various TSX Client applications 340. The SMT Client Manager software 326 communicates with the TSX Client applications 340 via predefined protocols, such as Local Procedure Calls (LPCs) or Transmission Control Protocols/Internet (TCP/IP) protocols. PLCs and TCP/IP protocols are well known to those having ordinary skill in the art, and therefore will not be described herein.

One or more TSX Client applications 340 can simultaneously and/or concurrently execute in user mode. The TSX Client applications 340 use information provided by the OS 108 in real-time while having the ability to employ a wide range of functionality. The wide range of functionality includes, but is not limited to, monitoring File I/O kernel mode requests, granting File I/O kernel mode requests, denying File I/O kernel mode requests, and accessing registries. The TSX Client applications 340 can operate in Secure Desktop environment provided by the SDS software 320.

If the OS 108 is a Windows operating system, then the TSX Client applications 340 can be standard WIN32 or WIN64 applications. WIN32 and WIN64 applications are well known to those having ordinary skill in the art, and therefore will not be described herein. The TSX Client applications 340 can directly interface the TSX Core software 312 using a TSX Application Programming Interface (API). APIs are well known to those having ordinary skill in the art, and therefore will not be described herein. The TSX Client applications 340 can provide additional functionalities to the end-user independently from the Secure Desktop software 314. The additional functionalities can include, but are not limited to, non-security software features (e.g., data input functions, spreadsheet functions, or word processor functions). The phrase "end-user", as used herein, refers to a person or persons using a device the enables him or them to use the present invention. The TSX Client applications 340 can be validated against a required digital signature before being allowed to interface with the TSX Core software 312.

The Element Engine code 342 is generally operative to provide an SDS Mini-stack functionality to the client computer 102. The SDS Mini-stack functionality can include, but is not limited to, displaying an SDS Mini-stack on a display screen 204 of the client computer 102, enabling/disabling secure communications between a US site 130 and a client computer 102 via the Secure-Talk server computer 122 of the SMS site 140, gathering data related to the usage of SDS software 320, gathering data indentifying advertisements clicked on by a user (not shown) of the client computer 102, gathering data identifying links followed by the user (not shown) of the client computer, and gathering data indentifying network sites visited by the user (not shown) of the client computer. The gathered data can be stored in a memory 210 of the client computer 102 and/or in a memory of the License/Database server computer 120 of the SMS site 140. A schematic illustration of an exemplary SDS Mini-stack 990 is provided in FIG. 9.

Figure 9:
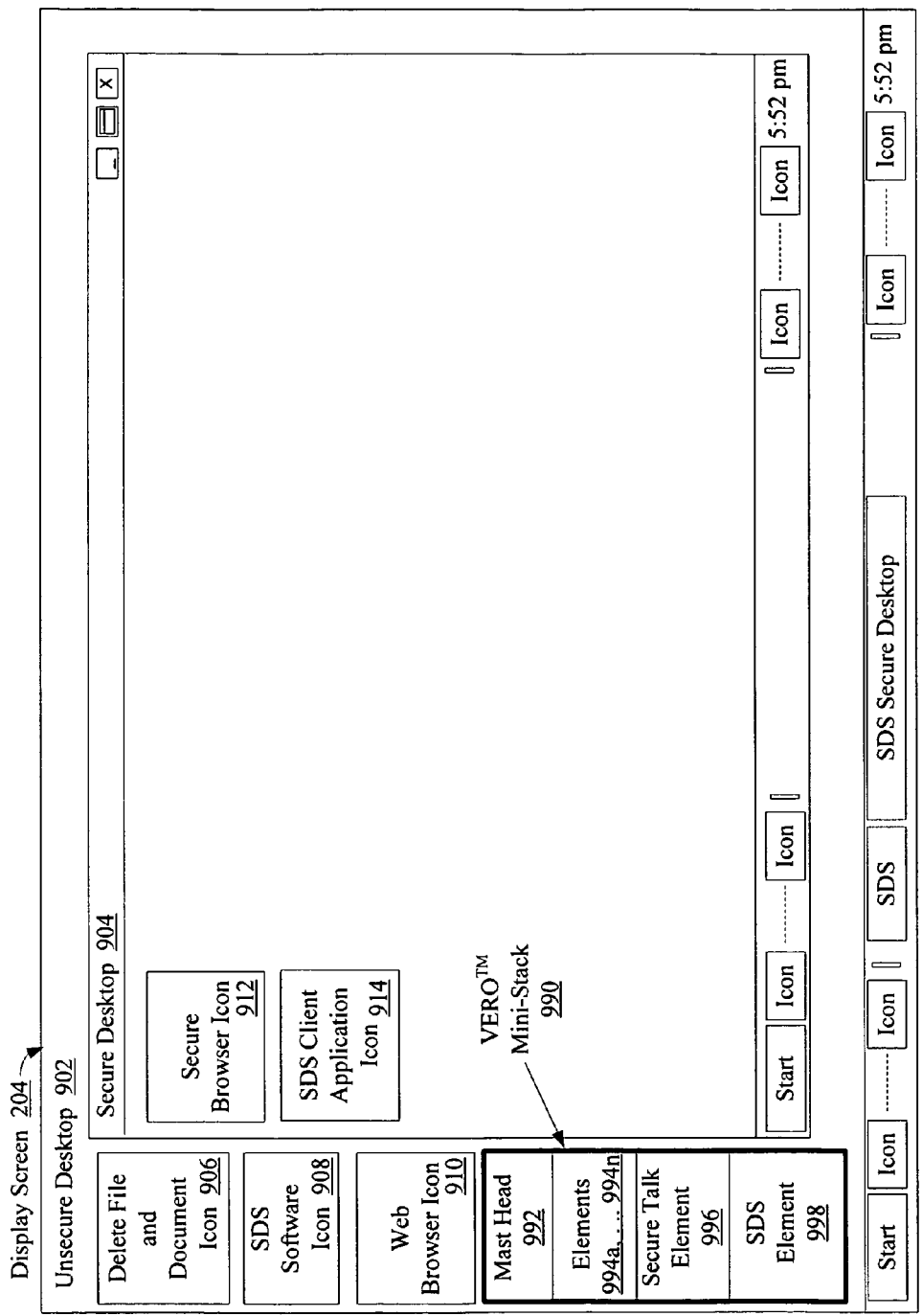
FIG. 9 is a schematic illustration of the display screen of FIG. 2 having an Unsecured Desktop with an SDS Mini-stack and a Secured Desktop displayed thereon.

As shown in FIG. 9, the exemplary SDS Mini-stack 990 includes a mast head 992, a plurality of elements 994a, 994b, ..., 994n, a Secure Talk element 996, and an SDS software element 998. The mast head 992 can be, but is not limited to, a sponsor branded mast head in the form of a borderless browser window. The sponsor branded mast head can include, but is not limited to, a sponsor brand (or mark) that can be changed using data stored in a configurations file and/or using data obtained from the SMS site. The elements 994a, 994b, ..., 994n can provide a means to display web content, sponsor related content, or other content without the requirement of opening a full web browser. The Secure Talk element 996 provides a means for enabling and/or disabling secure communications between a US site 130 and a client computer 102 via the Secure-Talk server computer 122 of the SMS site 140. The SDS software element 998 provides a means to launch or activate the Secure Desktop software 314, the Secure Browser(s) $110_1$, $110_2$ (not shown), ..., $110_p$, and/or the SDS client application(s) $318_1$, $318_2$ (not shown), ..., $318_p$. Notably, memory images of the elements 994a, 994b, ..., 994n, 996, 998 installed on the client computer 102 can be validated against memory images thereof installed on a License/Database server computer 120 of the SMS site 140. Also, each of the elements 994a, 994b, ..., 994n, 996, 998 is protected against tampering and monitoring by malware. This malware protection is facilitated by registry key protection, kernel mode level file protection, code injection protection, and screen scraper protection performed by the TSX Core software 312.

Referring again to FIG. 3, the Element code $344_1$, $344_2$, ..., $344_q$ is generally operative to obtain and display web content, sponsor related content, or other content in an element 994a, 994b, ..., 994n of the SDS Mini-stack 990 without the requirement of opening a full web browser.

According to an embodiment of the present invention, the Element code $344_1, 344_2, \ldots, 344_q$ is generally operative to obtain and display web feeds, news feeds, Rich Sequence Format (RSF) feeds, and Hyper Text Markup Language (HTML) content in an element $994a, 994b, \ldots, 994n$ of the SDS Mini-stack 990. Embodiments of the present invention are not limited in this regard.

The SDS software 320 is generally operative to provide a Secure Desktop environment for one more SDS Client applications $318_1, 318_2$ (not shown), $\ldots, 318_p$ and/or TSX Client applications 340 installed on the client computer 102. The SDS software 320 includes Secure Desktop software 314 and Secure Browser software $110_1, 110_2$ (not shown), $\ldots, 110_p$ that can execute on the client computer 102. The Secure Desktop software 314 can communicate with the TSX Core software 312 via an Application Programming Interface (API) using predefined protocols. The predefined protocols can include, but are not limited to, LPCs and TCP/IP protocols.

The SDS software 320 is also generally operative to interact with estore/edirectory software installed on a server computer of the SMS site 140. Estore/edirectory software is well known to those having ordinary skill in the art, and therefore will not be described in detail herein. However, it should be understood that the estore/edirectory software provides an on-line shopping facility in which purchases can be made via the SMS site 140 using a credit card for merchandise. The SDS software 320 can further be operative to communicate with the License/Database server computer 120 of the SMS site 140 via a secure communication link for logging, gathering, and storing certain information thereon. The information can include, but is not limited to, SDS software 320 usage information, network site selection information, and advertisement information identifying advertisements clicks on by a user (not shown) of a client computer 102.

The Secure Desktop software 314 provides security services to the SDS Client applications $318_1, 318_2$ (not shown), $\ldots, 318_p$ and the Secure Browser software $110_1, 110_2$ (not shown), $\ldots, 110_p$. The security services include, but are not limited to, an ability to protect a range of registry keys and files from being modified and/or deleted, an ability to prevent code injection into a running SDS Client application $318_1, 318_2, \ldots, 318_p$ and/or running Secure Browser software $110_1, 110_2$ (not shown), $\ldots, 110_p$, an ability to prevent a termination of a running process, an ability to protect against keyloggers, an ability to protect against screen scrapers, and an ability to protect against other malware. The term "keylogger", as used herein, refers to a special type of malware that attempts to capture private data from a user of a computer system by capturing key strokes and mouse clicks from a user interface (e.g., user interface 202 of FIG. 2) of the computer system (e.g., the client computer 102 of FIGS. 1 and 2). The phrase "screen scraper", as used herein, refers to a special type of malware that attempts to capture private data from a user of a computer system by capturing information as it is displayed on a display screen (e.g., the display screen 204 of FIG. 2) of the computer system (e.g., the client computer 102 of FIGS. 1 and 2). The term "malware", as used herein, refers to software executing on a computer system that performs operations solely to the benefit of an unauthorized party or otherwise harmful to the computer system.

The Secure Browser software $110_1, 110_2$ (not shown), $\ldots, 110_p$ is a special form of an SDS Client application that is further protected against tampering by means of encryption. In this regard, it should be understood that the Secure Browser software $110_1, 110_2$ (not shown), $\ldots, 110_p$ can be stored in an encrypted format within a memory (e.g., the memory 210 of FIG. 2) of the client computer 102. In such a scenario, the Secure Browser software $110_1, 110_2$ (not shown), $\ldots, 110_p$ is decrypted each time the SDS software 320 is launched. The encryption and decryption of the Secure Browser software $110_1, 110_2$ (not shown), $\ldots, 110_p$ ensures that the Secure Browser software $110_1, 110_2$ (not shown), $\ldots, 110_p$ cannot be tampered with when the SDS software 320 is inactive. The Secure Browser software $110_1, 110_2$ (not shown), $\ldots, 110_p$ can connect to one or more server computers (e.g., the server computer 106 of FIG. 1) via a network (e.g., the network 104 of FIG. 1). The Secure Browser software $110_1, 110_2$ (not shown), $\ldots, 110_p$ can be disabled or terminated via user actions. Subsequent to being disabled, the Secure Browser software $110_1, 110_2$ (not shown), $\ldots, 110_p$ and associated files are deleted.

Notably, the Secure Browser software $110_1, 110_2$ (not shown), $\ldots, 110_p$ is fully protected against tampering by hackers with access to the client computer 102 and malware operating on the client computer 102. In effect, the Secure Browser software $110_1, 110_2$ (not shown), $\ldots, 110_p$ is uniquely positioned to perform operations on data accessed over the network (e.g., the network 104 of FIG. 1) or on the client computer 102.

The SDS Client applications $318_1, 318_2$ (not shown), $\ldots, 318_p$ execute in user mode. At least a first one of the SDS Client applications $318_1, 318_2$ (not shown), $\ldots, 318_p$ can be a standard WIN32 application or a standard WIN64 application. WIN32 and WIN64 applications are well known to those having ordinary skill in the art, and therefore will not be described herein. The SDS Client application $318_1, 318_2$ (not shown), $\ldots, 318_p$ can be launched on a Secure Desktop (e.g., the Secure Desktop 904 shown in FIG. 9) after the SDS Client applications $318_1, 318_2$ (not shown), $\ldots, 318_p$ have been deemed trusted applications. The phrase "trusted application", as used herein, refers to an application that is an untampered, well known application.

At least a second one of the SDS Client applications $318_1, 318_2$ (not shown), $\ldots, 318_p$ can provide the Secure Desktop environment from which other applications and programs can be launched while being fully protected against tampering and monitoring by malware. This malware protection is facilitated by registry key protection, kernel mode level file protection, code injection protection, and screen scraper protection. The registry key protection and kernel mode level file protection will be described in detail below in relation to FIG. 6. The code injection protection will be described in detail below in relation to FIG. 7. The screen scraper protection will be described in detail below in relation to FIG. 8.

The SDS Client applications $318_1, 318_2$ (not shown), $\ldots, 318_p$ simultaneously and concurrently execute in user mode. If the SDS Client applications $318_1, 318_2$ (not shown), $\ldots, 318_p$ employ security measures (e.g., security measures of granting or denying File I/O kernel mode requests related to the SDS Client applications $318_1, 318_2$ (not shown), $\ldots, 318_p$), then malware trying to compromise (i.e., gather or manipulate) data used by the SDS Client applications $318_1, 318_2$ (not shown), $\ldots, 318_p$ is locked out. In effect, the overall security of the client computer 102 is increased as compared to conventional client computer systems.

The SDS Client applications $318_1, 318_2$ (not shown), $\ldots, 318_p$ simultaneously use monitoring, interception, and redirection of operating system events to provide application security functions. The application security functions can include, but are not limited to, anti spyware functions, anti virus functions, on-the-fly data encryption functions, firewall functions, network related functions, file software related functions, and registry related software functions. Notably, the monitoring, interception, and redirection of operating system events is enabled by the TSX Core software 312.

The SDS software 320 can scan hardware (e.g., memory) and running software for viruses and malware using an Anti-Virus and/or Malware Scan Engine code 322. In such a scenario, the SDS software 320 can take appropriate actions to ensure that any detected malware is neutralized prior to starting the Secure Desktop software 314.

According to embodiments of the present invention, the SDS software 320, TSX Core software 312, TSX Client applications 340, SFS software 380, Element Engine code 342, and Element code $344_1$, $344_2$ (not shown), ..., $344_q$ are installed on the client computer 102, uninstalled from the client computer 102, activated, and/or disabled via user actions. The SDS software 320, TSX Core software 312, TSX Client applications 340, SFS software 380, Element Engine code 342, and Element code $344_1$, $344_2$ (not shown), ..., $344_q$ can also be disabled or uninstalled when all running applications $110_1$, $110_2$ (not show), ..., $110_p$, $318_1$, $318_2$ (not shown), ..., $318_p$ are terminated by a user (not shown) of the client computer 102. The SDS software 320 can be validated against a trusted license upon activation. Once activated, no other applications are permitted to start. However, running applications are allowed to continue to execute provided that the running applications have been deemed to be non-malicious software. The SDS software 320 and the TSX Core software 312 collectively provide the client computer 102 with persistent security features. The phrase "persistent security features", as used herein, means that one or more security features remain active between restarting of the OS 108. For example, if the OS 108 starts the TSX Core software 312 during a boot process, then a number of security features as pre-defined through policies during a previous session of a Secure Desktop or a secure application will be in place prior to any new session of the SDS software 320 and/or selected applications. In effect, the persistent security features can prevent tampering with critical components of the SDS software 320 and selected applications when the SDS software 320 is not active. Embodiments of the present invention are not limited in this regard.

In view of the forgoing, it should be emphasized that the TSX Client applications 340, the Secure Desktop software 314, and the SDS Client applications $318_1$, $318_2$ (not shown), ..., $318_p$ communicate with the TSX Core software 312 using an inter process communications based on pre-defined protocols (e.g., LPCs and TCP/IP protocols). In effect, the SDS software 320 controls actions taken by the OS 108 when certain kernel mode events occur. For example, access to certain registry keys or files may be blocked on behalf of the SDS Client applications $318_1$, $318_2$ (not shown), ..., $318_p$ or the TSX Client applications 340.

It should also be emphasized that the security features of the TSX Core software 312 and the SDS software 320 provide a secure environment to access data on a local device (e.g., the client computer 102 of FIGS. 1-3) or over a network (e.g., the network 104 of FIG. 1). The secure environment can protect registry keys from being modified, protect files from being modified, protect registry keys from being deleted, protect files from being deleted, prevent code injection into running software processes, prevent termination of running software processes, and protect against keyloggers, screen scrapers, and malware.

Notably, the system 100 of FIG. 1 implements a method 400 for protecting data accessed through a network connection. The following FIGS. 4A-4G and accompanying text illustrate such a method 400 for protecting data accessed through a network connection. It should be appreciated, however, that the method disclosed herein is provided for purposes of illustration only and that embodiments of the present invention are not limited solely to the method shown.

Figure 4A:
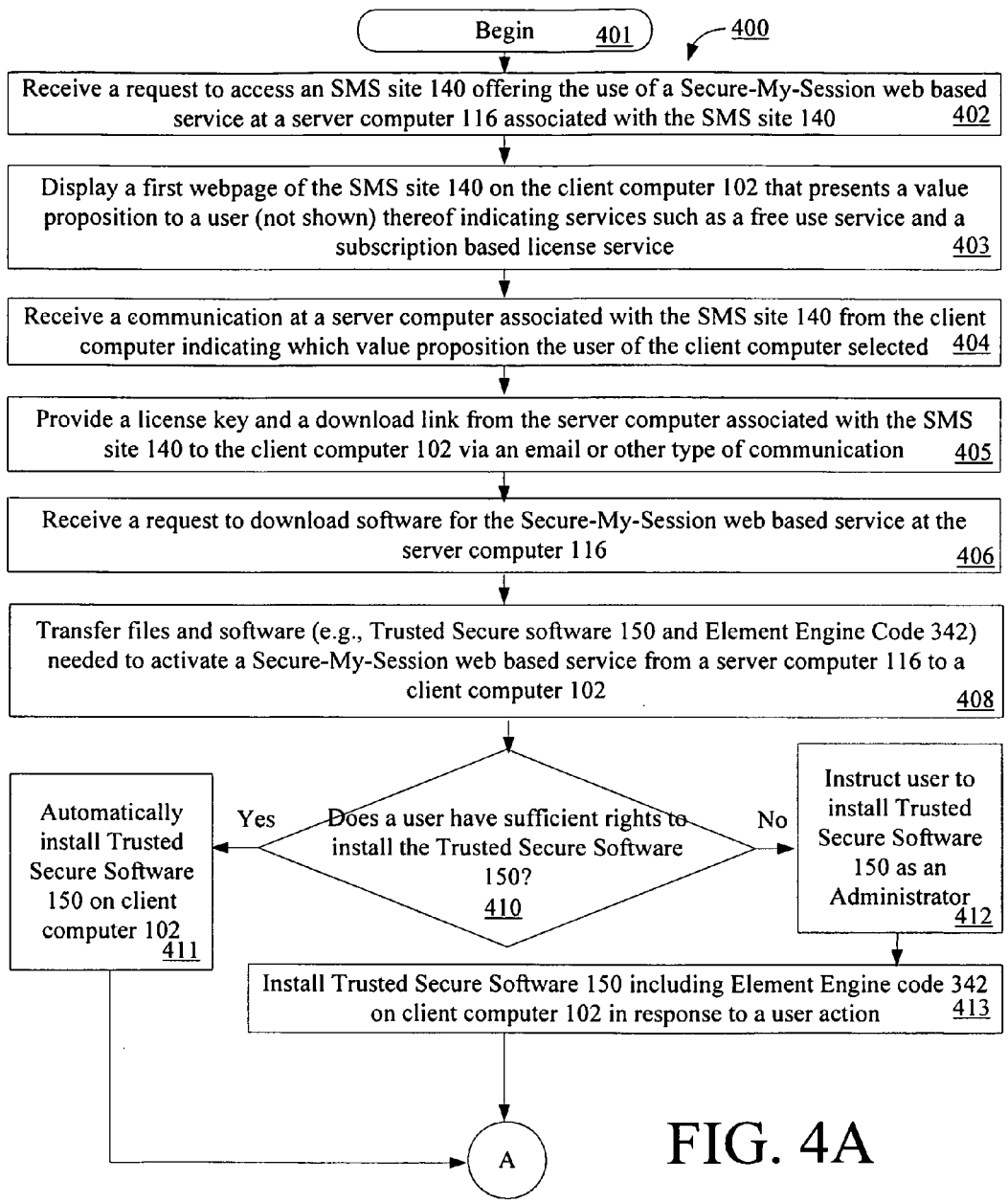
FIGS. 4A-4G collectively provide a flow diagram of an exemplary method for protecting data accessed through a network according to an embodiment of the present invention.

Referring now to FIG. 4A, the method 400 begins with step 401 and continues to step 402. In step 402, a request to access an SMS site (e.g., the SMS site 140 of FIG. 1) is received at a server computer (e.g., the server computer 106 of FIG. 1) associated with the SMS site. The request can be generated at a client computer (e.g., the client computer 102 of FIG. 1). The SMS site offers the use of a Secure-My-Session service to client computers (e.g., the client computer 102 of FIG. 1). The Secure-My-Session service generally protects data accessed through a network connection by providing secure network connections to network sites (e.g., the US site 130 of FIG. 1 and the SMS site 140 of FIG. 1), protecting registry keys from being modified, protect files from being modified, protecting registry keys from being deleted, protecting files from being deleted, preventing code injection into running software processes, preventing termination of running software processes, and protecting against malware.

After receiving the request at the SMS site, step 403 is performed where a first webpage of the SMS site is displayed on the client computer. The first webpage can include content presenting a value proposition to a user (not shown) of the client computer. The value proposition can indicate different types of authorized uses of the Secure-My-Session service, such as a free use of the Secure-My-Session service and a subscription based license for using the Secure-My-Session service. In the next step 404, a communication is received at the server computer of the SMS site from the client computer. The communication indicates which value proposition the user (not shown) of the client computer selected. Step 404 can involve generating the communication at the client computer in response to a user actions (e.g., moving a mouse until a mouse cursor is on top of a value proposition icon (not shown) displayed on the first webpage and clicking a right button of the mouse). Step 404 can also involve communicating the generated communication from the client computer to the server computer of the SMS site via a network connection.

Thereafter, step 405 is performed where a license key and download link are provided from the server computer of the SMS site to the client computer 102 via an email or other type of communication. The download link can redirect communications to a download server of the SMS site servicing initial software downloads and subsequent software updates. In step 406, a request to download software for the Secure-My-Session service is generated at the client computer in response to a user action (e.g., moving a mouse until a mouse cursor is on top of a Hyperlink (not shown) and clicking a button of the mouse). The generated request is then communicated to and received at the server computer of the SMS site. In the next step 408, files and software needed to activate a Secure-My-Session service is transferred from the SMS site to the client computer. The software can include, but is not limited to, the Trusted Secure software 150 of FIG. 3 and the Element Engine code 342 of FIG. 3.

Figure 4B:
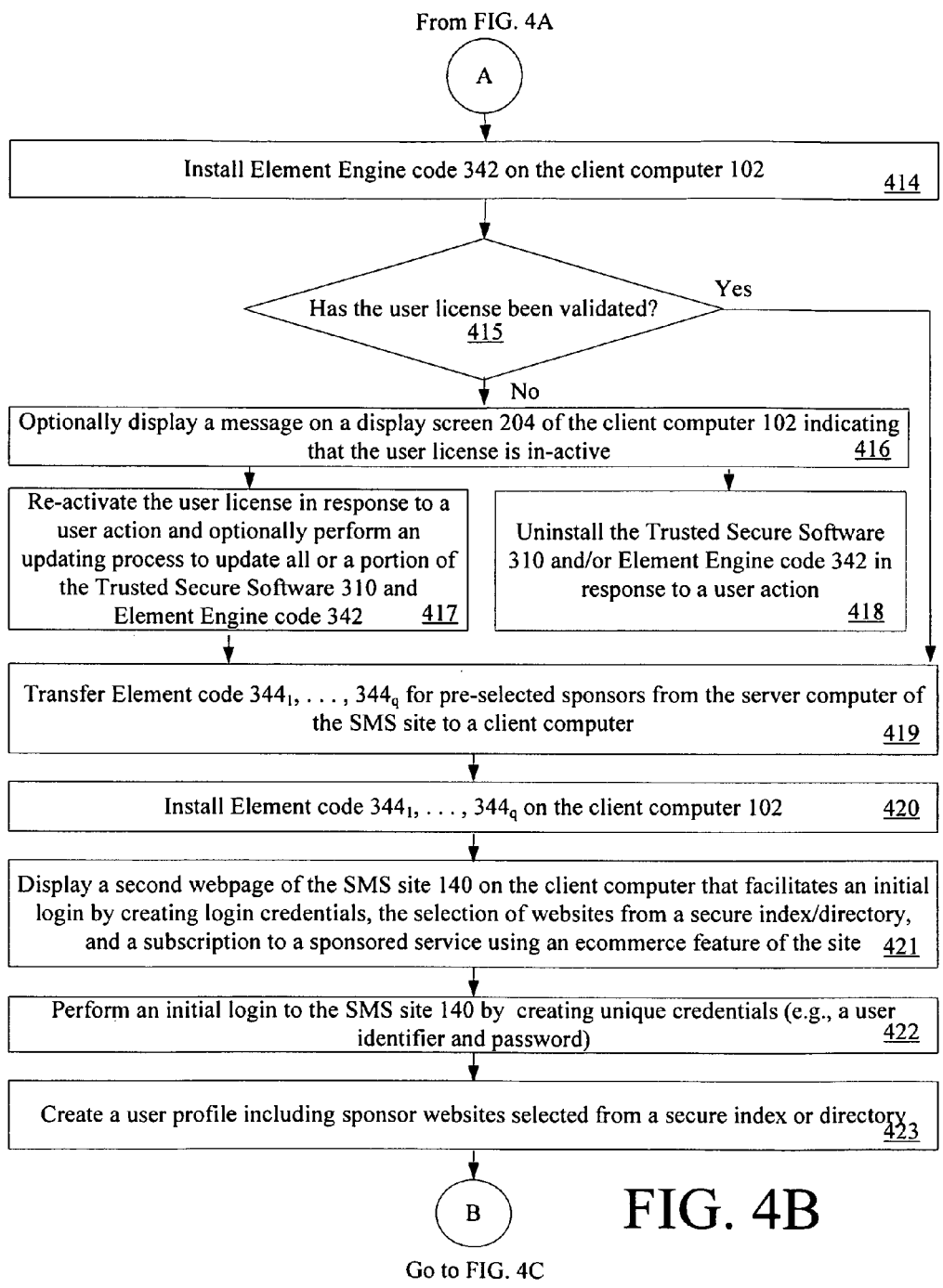

After transferring the files and software from the SMS site to the client computer, a decision step 410 is performed for determining if a user (not shown) of the client computer has sufficient rights to install the Trusted Secure software 150 of FIG. 3. If the user (not shown) of the client computer has sufficient rights to install the Trusted Secure software 150 [410:YES], then the method 400 continues with step 411. In step 411, the Trusted Secure software 150 is automatically installed on the client computer. Subsequent to installing the Trusted Secure software 150 on the client computer, step 414 of FIG. 4B is performed. Step 414 will be described below.

If the user (not shown) of the client computer does not have sufficient rights to install the Trusted Secure software 150 [410:NO], then the user (not shown) of the client computer is instructed to install the Trusted Secure software 150 as an Administrator in step 412. In step 413, the Trusted Secure software 150 is installed on the client computer in response to a user action. Subsequent to installing the Trusted Secure software 150 on the client computer, step 414 of FIG. 4B is performed.

Referring now to FIG. 4B, step 414 involves installing the Element Engine code 342 on the client computer. Thereafter, a decision step 415 is performed for determining if the user license has been validated. If the user license has been validated [415:YES], then the method 400 continues with step 419 which will be described below. If the user license has not been validated [415:NO], then the method 400 continues with steps 416, 417, and/or 418. Step 416 is an optional step in which a message indicating that the user license is in-active is displayed on a display screen (e.g., the display screen 204 of the client computer 102). After completing step 416, the method 400 continues with either step 417 or step 418. Step 417 involves re-activating the user license in response to a user action. Step 417 also involves optionally performing an updating process to update all or a portion of the Trusted Secure software 310 and the Element Engine code 342. Step 418 involves uninstalling the Trusted Secure software 310 and/or Element Engine code 342 in response to a user action.

Upon completing step 417, the method 400 continues with step 419 where Element code $344_1$, $344_2$ (not shown in FIG. 3), . . . , $344_q$ for pre-selected sponsors is transferred (or downloaded) from the server computer of the SMS site to the client computer. The transferred (or downloaded) Element code $344_1$, $344_2$ (not shown in FIG. 3), . . . , $344_q$ is then installed on the client computer in step 420.

Next, step 421 is performed where a second webpage of the SMS site is loaded and displayed on the client computer. The second webpage can be loaded using a default secure DNS IP address. The second webpage facilitates (a) an initial login to the SMS site by creating login credentials (e.g., a user name and password), (b) the selection of network sites from a secure index or directory, and/or (c) a subscription to a sponsored service using an ecommerce feature of the SMS site. Thereafter, step 422 is performed where an initial login to the SMS site is performed by creating the unique credentials for the user (not shown) of the client computer. In step 423, a user profile is created including sponsor network sites selected by the user (not shown) of the client computer from the secure index or directory. The secure index or directory can include, but is not limited to, a list of free and sponsored sites supported by the Secure-My-Session service. Upon creating the user profile, the method 400 continues with step 424 of FIG. 4C.

Figure 4C:
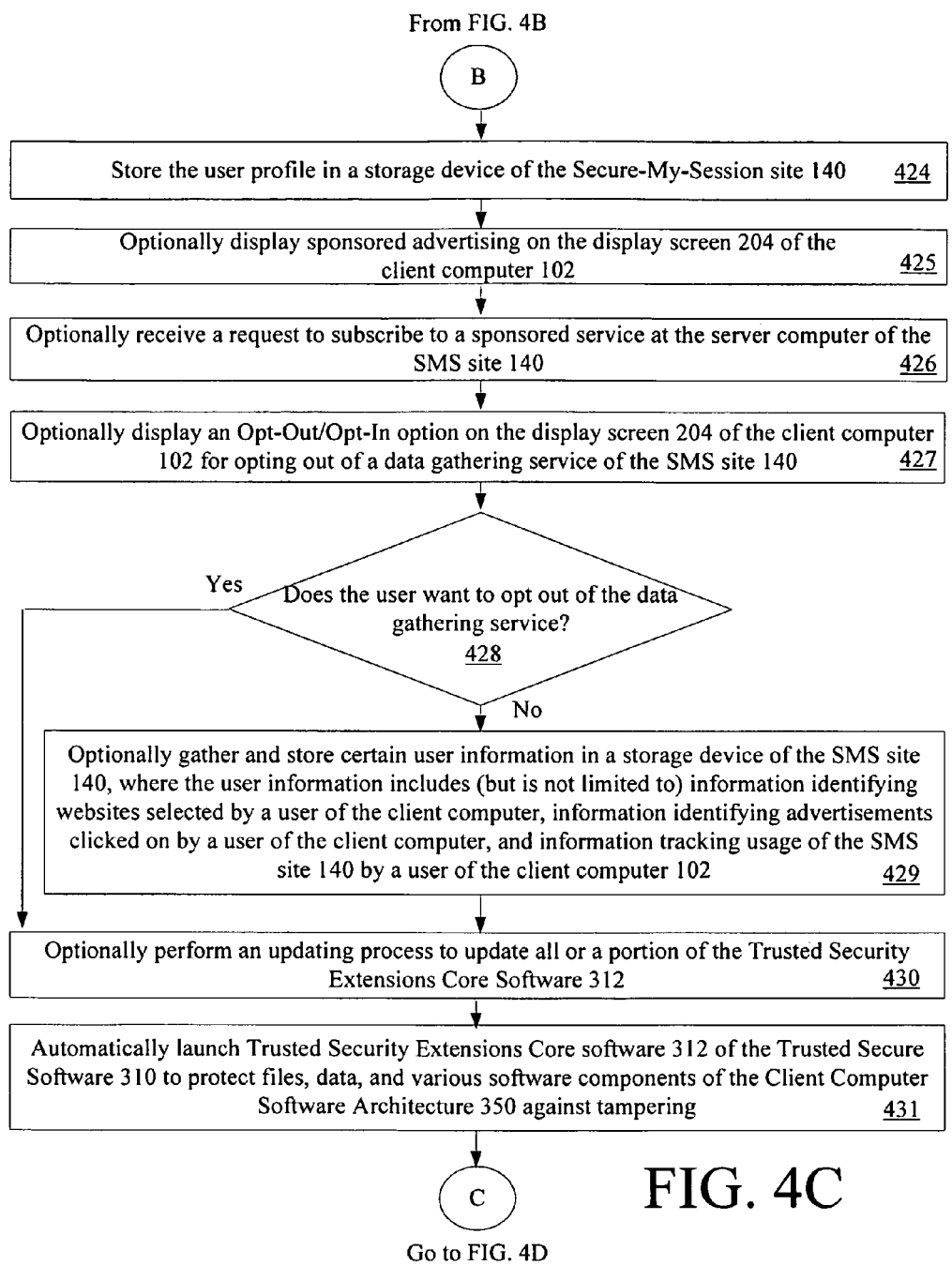

Referring now to FIG. 4C, step 424 involves storing the user profile in a storage device of the SMS site. For example, the user profile can be stored in a memory device of the License/Database server computer of the SMS site (e.g., the License/Database server computer 120 of FIG. 1) in a given format (e.g., a browser cookie format or a database profile format). In a next optional step 425, sponsored advertising is optionally displayed on the display screen of the client computer. Thereafter, a request to subscribe to a sponsored service is generated at the client computer in response to a user action (e.g., moving a mouse until a mouse cursor is on top of a sponsored advertisement and clicking a button of the mouse). The generated response is received at the server computer of the SMS site in optional step 426. In optional step 427, an opt-out/opt-in option can be displayed on the display screen of the client computer for opting out of a data gathering service of the SMS site.

Upon completing optional step 427, an optional decision step 428 is performed for determining if the user (not shown) of the client computer wants to opt-out of the data gathering service. If the user (not shown) of the client computer wants to opt-out of the data gathering service [428:YES], then the method 400 continues with optional step 430 which will be described below. If the user (not shown) of the client computer does not want to opt-out of the data gathering service [428:NO], then optional step 429 is performed where certain user information is gathered and stored in a storage device of the SMS site. The user information can include, but is not limited to, information identifying network sites selected by a user (not shown) of the client computer, information identifying advertisements clicked on by the user (not shown) of the client computer, and information tracking usage of the SMS site by the user (not shown) of the client computer.

In an optional step 430, an updating process is performed to update all or a portion of the TSX Core software 312 of the Trusted Security software 150 previously installed on the client computer. Next, the TSX Core software 312 of the Trusted Secure Software 310 is automatically launched in step 431. As noted above, the TSX Core software 312 protects data files, data, and various software components of a client computer software architecture (e.g., the software architecture 350 of FIG. 3) against tampering. This tampering protection is facilitated by the performance of kernel mode file protection operations, registry protection operations, process protection operations, and/or code injection prevention operations which are performed in step 432 of FIG. 4D.

Figure 4D:
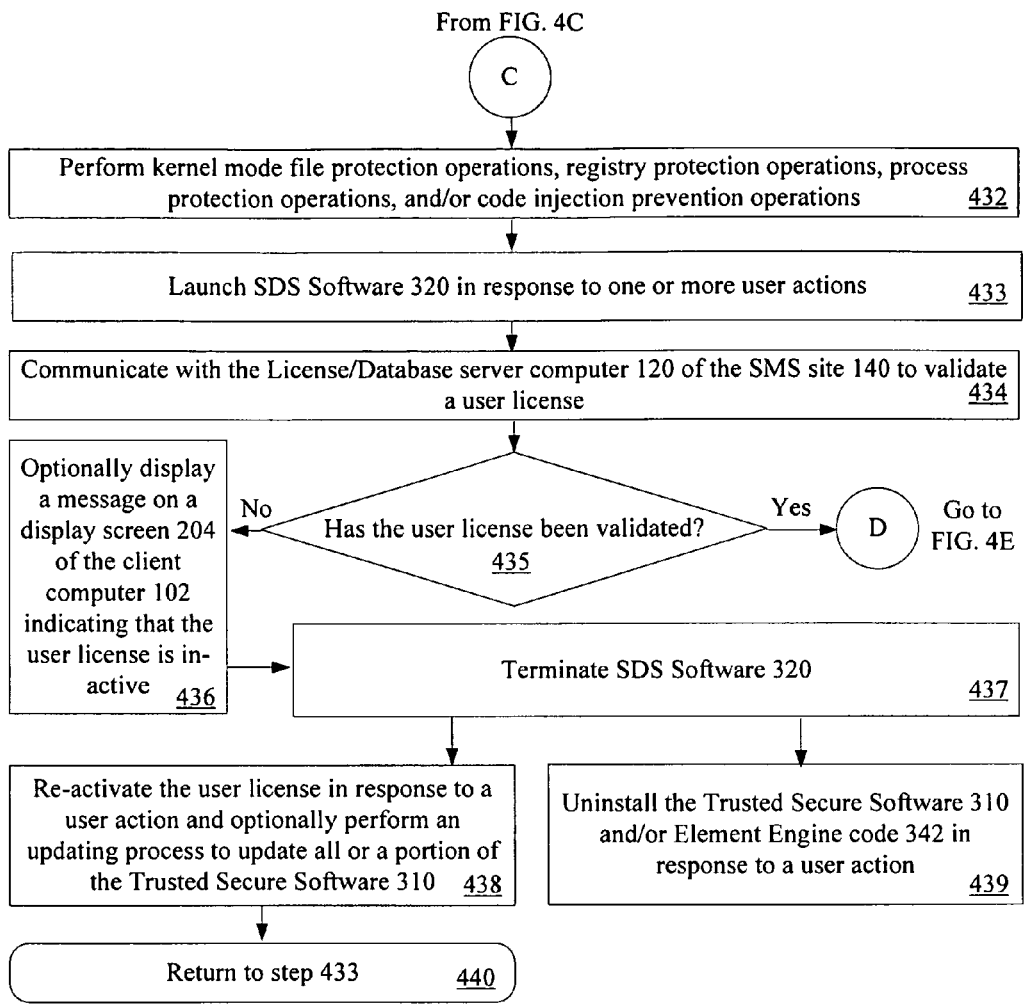

The registry and file protection operations of step 432 of FIG. 4D can include, but are not limited to, monitoring user-mode events, determining if the user-mode events are Registry or File System events, and allowing/blocking the Registry or File System events based on a predefined policy. The code injection prevention operations can include, but are not limited to, monitoring functions used to inject code into software components (e.g., the software components $302_1$, $302_2$, . . . , $302_n$, 108, 306, $308_1$, $308_2$, . . . , $308_m$, $360_1$, $360_2$ (not shown in FIG. 3), . . . , $360_n$, 362, 366, 150 of FIG. 3) of a software architecture (e.g., the client computer software architecture 350 of FIG. 3), intercepting these functions, and preventing these functions from succeeding if they are determined to be used by malware or an application running in an Unsecured Desktop (e.g., the Unsecured Desktop 902 shown in FIG. 9).

Referring now to FIG. 4D, the method 400 continues with step 433 where SDS software 320 is launched in response to a user action. The SDS software 320 can be launched via an SDS software icon link displayed on an Unsecured Desktop (e.g., the Unsecured Desktop 902 shown in FIG. 9) of the client computer or from an SDS Element (e.g., the SDS Element 998 of FIG. 9) of an SDS mini-stack (e.g., the SDS mini-stack 990 of FIG. 9). As such, the user actions can include, but are not limited to, moving a mouse until a mouse cursor is on top of an SDS software icon (e.g., the SDS icon 908 of FIG. 9) displayed on an Unsecured Desktop (e.g., the Unsecured Desktop 902 shown in FIG. 9) or on top of an SDS Element of an SDS mini-stack, and clicking a right button of the mouse.

In response to launching the SDS software 320, step 434 is performed where the client computer communicates with a server computer (e.g., the server computer 106 of FIG. 1) via a network (e.g., the network 104 of FIG. 1) to validate a user license. The user license can be validated using a mechanism that uniquely identifies the client computer. This mechanism can employ a unique key generated at the client computer. Such a unique key mechanism can facilitate the tailoring of configurations and updates to the client computer.

If the user license has not been validated [435:NO], then the method 400 continues with an optional step 436. Optional step 436 involves displaying a message on a display screen (e.g., the display screen 204 of FIG. 2) of the client computer indicating that the user license is inactive. The SDS software 320 is also terminated in step 437. Subsequently, step 438 or step 439 is performed. In step 439, the Trusted Secure Software 310 is uninstalled in response to one or more user actions. In step 438, the user license is reactivated in response to one or more user actions. Also, an optional updating process is performed to update all or a portion of the Trusted Secure Software 310. After reactivating the user license and/or performing the optional updating process, step 440 is performed where the method returns to step 433 and/or subsequent processing is resumed.

Figure 4E:
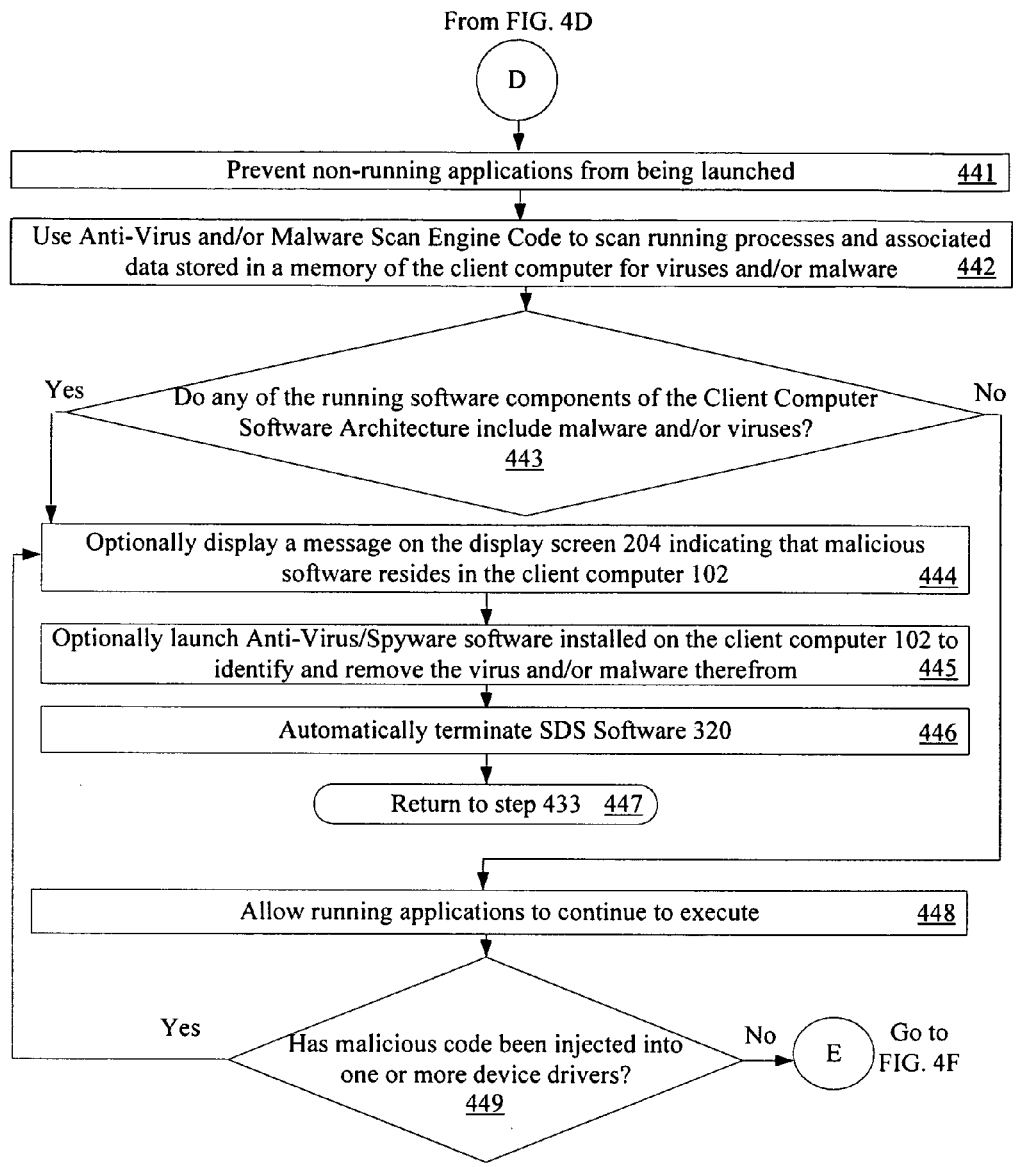

If the user license has been validated [435:YES], then the method 400 continues with step 441 of FIG. 4E. Step 441 involves preventing non-running applications (e.g., applications $308_1, 308_2, \ldots, 308_p$ of FIG. 3) from thereafter being launched during the remaining period during which the SDS software continues to execute. In the next step 442, an Anti-Virus and/or Malware Scan Engine code (e.g., the Anti-Virus and/or Malware Scan Engine code 322 of FIG. 3) is utilized to scan running processes and associated program data for viruses and/or malware. The program data associated with running processes can be stored in a memory (e.g., the memory 210 of FIG. 2) of the client computer. If any of the running software components includes malware and/or a virus [443:YES], then steps 444-447 are performed. Step 444 involves optionally displaying a message on a display screen (e.g., the display screen 204 of FIG. 2) of the client computer indicating that malicious software resides in the client computer. In step 445, an Anti-Virus/Spyware software installed on the client computer is optionally launched. The Anti-Virus/Spyware software can indentify and/or facilitate the removal of malware and/or virus from the client computer. The Anti-Virus/Spyware software can include, but is not limited to, NORTON ANTIVIRUS™ software available from Symantec Corporation of Cupertino, Calif. Thereafter, step 446 is performed where the SDS software 320 is automatically terminated. In step 447, the method 400 returns to step 433 of FIG. 4D or subsequent processing is resumed. It should be noted that steps 444-447 advantageously provide a client computer 102 in which malware can be identified and neutralized prior to launching the Secure Desktop software 314, Secure Browsers $110_1, 110_2, \ldots, 110_p$, and/or the SDS Client applications $318_1, 318_2, \ldots, 318_p$.

If any of the running software components does not include malware and/or a virus [443:NO], then the method 400 continues with step 448 where the running applications are allowed to execute. Subsequent to completing step 448, a decision step 449 is performed. If malicious code has been injected into one or more device drivers (e.g., the device drivers $302_1, 302_2, \ldots, 302_n, 360_1, 360_2$ (not shown in FIG. 3), $\ldots, 360_n$, and/or 362 of FIG. 3) [449:YES], then steps 444-447 are performed. As noted above, the method 400 returns to step 433 of FIG. 4D or subsequent processing is resumed in step 447. In effect, a keyboard and mouse security feature has been provided to the client computer. For example, if a driver for a keyboard and/or a mouse includes malicious code injected therein by malware, then the SDS software 320 is prevented from running until the malicious code is removed therefrom.

Figure 4F:
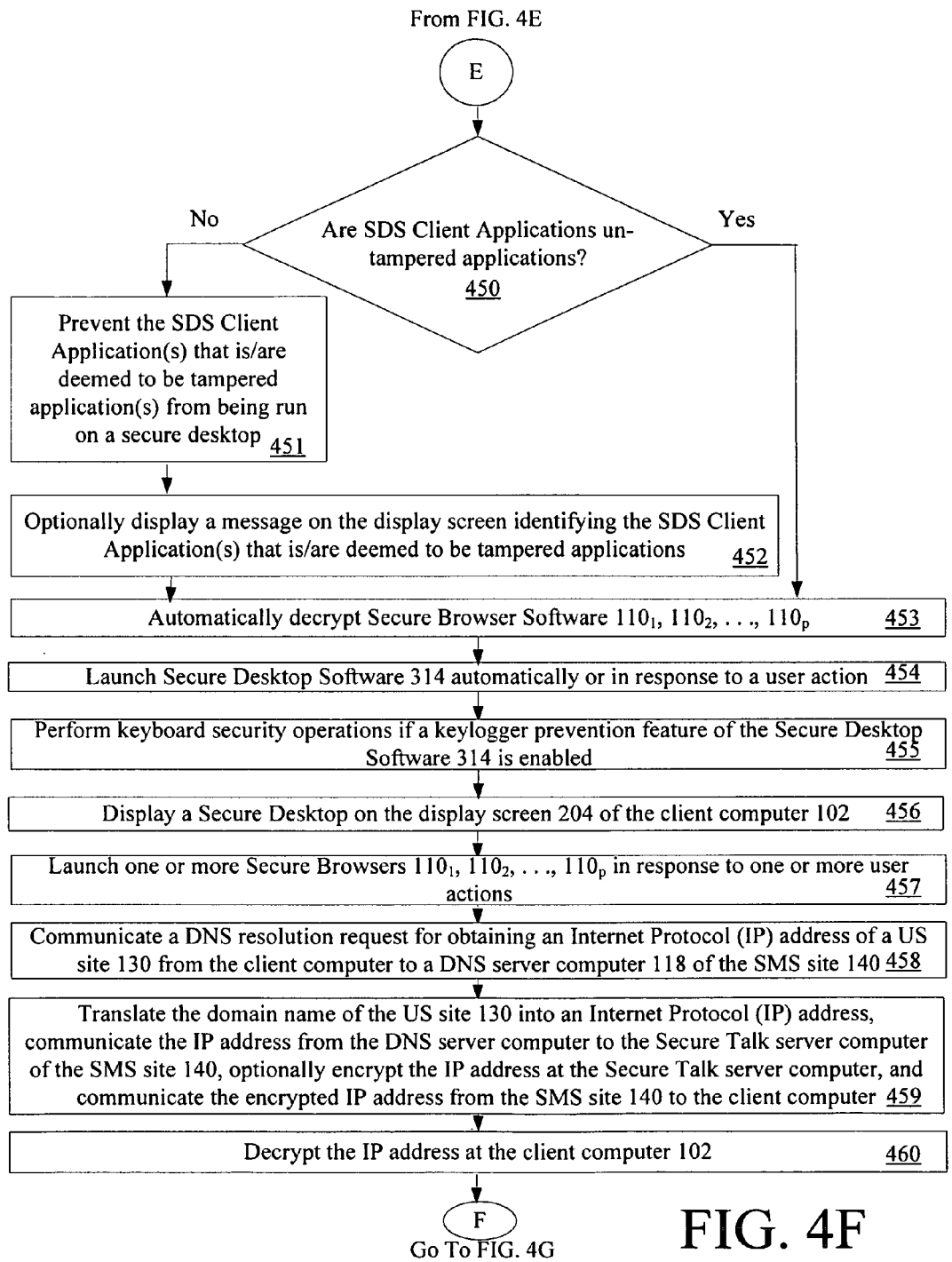

If malicious code has not been injected into one or more device drivers (e.g., the device drivers $302_1, 302_2, \ldots, 302_n, 360_1, 360_2$ (not shown in FIG. 3), $\ldots, 360_n$, and/or 362 of FIG. 3) [449:NO], then the method 400 continues with a decision step 450 of FIG. 4F where it is determined whether the SDS Client applications (e.g., the SDS Client applications $318_1, 318_2, \ldots, 318_n$ of FIG. 3) are tampered or un-tampered applications. This determination is made by verifying that a digital signature of a file is intact and valid by comparing memory images of the SDS Client applications installed on the client computer against disk images of the SDS Client applications on the client computer. The digital signature can be, but is not limited to, a Verisign level 3 digital signature which is well known to those having ordinary skill in the art.

If the SDS Client applications (e.g., the SDS Client applications $318_1, 318_2, \ldots, 318_n$ of FIG. 3) are un-tampered applications or tampering is being blocked by TSX Core software 312 of the Trusted Secure software 150 [450:YES], then the method 400 continues with step 453 of FIG. 4F (which will be described below). If the SDS Client applications are not un-tampered applications [450:NO], then steps 451 and 452 of FIG. 4F are performed.

Referring now to FIG. 4F, step 451 involves preventing the tampered SDS Client applications from being run on a Secure Desktop (e.g., the Secure Desktop 904 shown in FIG. 9) of the client computer. Step 452 involves optionally displaying a message on a display screen (e.g., the display screen 204 of FIG. 2) of the client computer indentifying the SDS Client application(s) that is(are) tampered applications. Next, step 453 is performed where Secure Browser software (e.g., the Secure Browser software $110_1, 110_2$ (not shown in FIG. 3), $\ldots, 110_p$ of FIG. 3) components of the SDS software is automatically decrypted.

Upon completing the decryption of the Secure Browser software, it is launched in step 454. The Secure Browser software can be launched automatically or in response to one or more user actions. In response to launching the Secure Browser software, steps 455 and 456 are performed. In step 455, keyboard security operations are performed if a keylogger prevention feature of the Secure Desktop software is enabled. The keyboard security operations will be described below in relation to FIG. 5. Step 456 involves displaying a Secure Desktop on the display screen of the client computer. A schematic illustration of an exemplary Secure Desktop 904 displayed on a display screen 204 is provided in FIG. 9.

As shown in FIG. 9, the Secure Desktop 904 is displayed on top of an Unsecure Desktop 902. The Secure Desktop 904 is configured to simultaneously run with the Unsecure Desktop 902. The Secure Desktop 904 provides a desktop environment in which end-user actions are performed while an underlying security software (e.g., the TSX Core software 312 of FIG. 3) protects all local software (e.g., the Secure Browsers $110_1, 110_2, \ldots, 110_p$ and SDS Client applications $318_1, 318_2, \ldots, 318_p$ of FIG. 3). The Secure Desktop 904 can include at least one icon 912 for launching a Secure Browser and at least one icon 914 for launching an SDS Client application. The term "icon", as used herein, means a small pictogram which represents a file, folder, application or device on a computer operating system. The Secure Desktop 904 can also include a taskbar at the bottom thereof. The term "taskbar", as used herein, means an application desktop bar which is to launch and monitor applications running on the desktop. The Unsecure Desktop 902 provides a desktop environment for an operating system (e.g. MICROSOFT WINDOWS™ and Mac OS X) in which applications can be launched and files can be open. Accordingly, the Unsecure Desktop 902 includes at least one icon 906 for deleting files and/or documents, at least one icon 908 for launching SDS software, and at least one icon 910 for launching an Unsecure Web Browser. Embodiments of the present invention are not limited in this regard. For example, the Unsecure Desktop 902 and Secure Desktop 904 can include any number of icons selected in accordance with a particular computer application.

Referring again to FIG. 4F, the method 400 continues with step 457 where one or more Secure Browsers $110_1$, $110_2$ (not shown), ..., $110_p$ are launched in response to one or more user actions. The user actions can include, but are not limited to, moving a mouse (not shown) until a mouse cursor (not shown) resides on top of an icon and clicking a button of the mouse (not shown). Subsequent to launching the Secure Browser(s) $110_1$, $110_2$ (not shown), ..., $110_p$, step 458 is performed where a first DNS resolution request for obtaining an IP address of a US site (e.g., the US site 130 of FIG. 1) is generated at the client computer and communicated therefrom to a Secure DNS server computer (e.g., the Secure DNS server computer 118 of FIG. 1) of the SMS site using a fixed IP address. The fixed IP address can be obtained from a configuration file (e.g., the configuration file 222 of FIG. 2) of the client computer. In a next step 459, a domain name of the US site is translated into an IP address. The IP address is communicated from the Secure DNS server computer to a Secure Talk server computer (e.g., the Secure Talk server computer 122 of FIG. 1) of the SMS site. At the Secure Talk server computer, the IP address is optionally encrypted. Thereafter, the IP address is communicated from the SMS site to the client computer via a network connection. The communications can be sent between the client computer and the server computers of the SMS site via an encrypted link using Hypertext Transfer Protocols (HTTP) or Hypertext Transfer Protocol over Secure Socket Layer (HTTPS). HTTPs and HTTPSs are well known to those having ordinary skill in the art, and therefore will not be described herein. Upon completing step 459, the method 400 continues with step 460 where the IP address is decrypted at the client computer. Subsequent to decrypting the IP address, step 461 of FIG. 4G is performed.

Figure 4G:
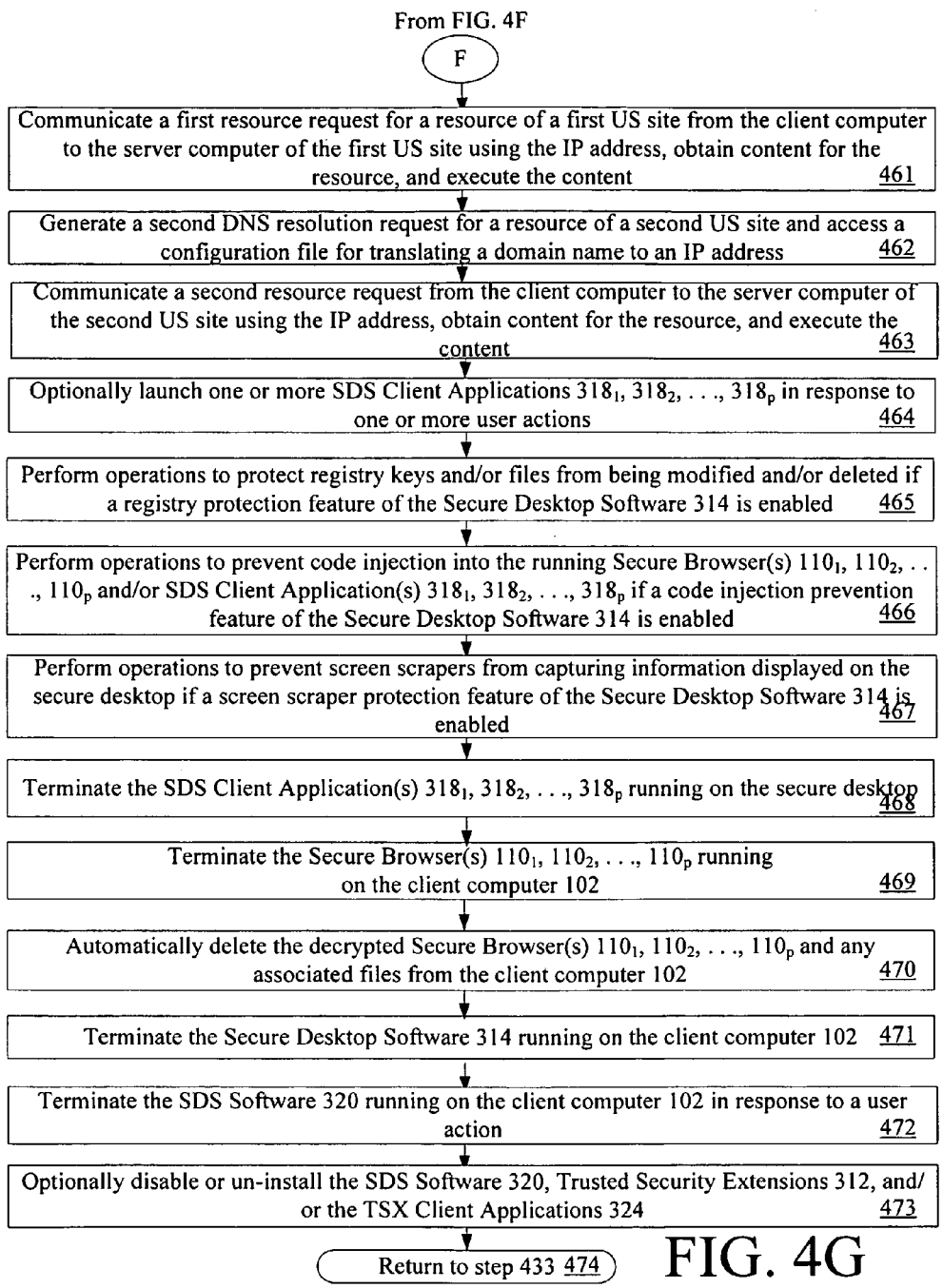

Referring now to FIG. 4G, step 461 is performed where a first resource request for a secure resource of the first US site is generated at the client computer using the IP address. The secure resource can be, but is not limited to, a webpage for a network site hosted by a particular entity (e.g., an online banking organization, a online stock trading organization, and/or an online social data exchange organization). The first resource request is communicated from the client computer to the server computer (e.g., the server computer 106 of FIG. 1) of the US site 130 via a secure link. The secure link is enabled by a Secure-Talk sever computer (e.g., the Secure-Talk server computer 122 of FIG. 1) of the SMS site. As noted above in relation to FIG. 1, the Secure-Talk sever computer can enable secure communications of information from a server computer of a US site to a client computer, and vice versa. The secure communications can be provide by the encryption of information to be communicated from the server computer of the US site to the client computer, and vice versa. Step 461 can also involve obtaining content for the secure resource and executing the content so as to display the content to the user (not shown) of the client computer.

Upon completing step 461, the method 400 can continue with step 462. In step 462, a second DNS resolution request for a resource of a second US site is generated at the client computer. In response to the second DNS resolution request, a configuration file (e.g., the configuration file 222 of FIG. 2) of the client computer is accessed for translating a domain name for the second US site to an IP address. In a next step 463, a second resource request is generated at the client computer and communicated therefrom to a server computer of the second US site using the IP address obtained from the configuration file. In response to the second resource request, content is obtained for the resource. Thereafter, the content is communicated from the server computer of the second US site to the client computer and executed at the client computer. After completing step 463, step 464 is performed where one or more SDS Client applications $318_1$, $318_2$, ..., $318_p$ are optionally launched in response to one or more user actions.

Next, the method 400 continues with a plurality of malware protection operations. These malware protection operations are performed in steps 465-467 of FIG. 4G if respective protection features of the Secure Desktop software 314 are enabled. For example, operations are performed in step 465 by the client computer to protect registry keys and/or files from being modified and/or deleted if a registry key protection feature of the Secure Desktop software 314 is enabled. The registry key and/or file protection operations will be described below in relation to FIG. 6. Similarly, operations are performed in step 466 by the client computer to prevent code injection into the running Secure Browser(s) $110_1$, $110_2$ (not shown), ..., $110_p$ and/or SDS Client applications $318_1$, $318_2$, ..., $318_p$ if a code injection prevention feature of the Secure Desktop software 314 is enabled. The code injection prevention operations will be described below in relation to FIG. 7. Operations are also performed in step 466 by the TSX Core software 312 installed on the client computer to prevent manipulation of the running Secure Browser or Secure Desktop processes, such as process termination actions or other actions affecting the normal operation of the Secure Browser or Secure Desktop processes being performed at the client computer. In step 47, operations are performed by the client computer to prevent screen scrapers from capturing information displayed on the Secure Desktop if a screen scraper protection feature of the Secure Desktop software 314 is enabled. The screen scraper prevention operations will be described below in relation to FIG. 8.

Once the user is finished performing operations in the Secure Desktop environment, steps 468-474 are performed. In step 468, the SDS Client applications $318_1$, $318_2$, ..., $318_p$ running on the Secure Desktop are terminated. The SDS Client applications $318_1$, $318_2$, ..., $318_p$ can be terminated in response to one or more user actions. Similarly, the Secure Browser(s) $110_1$, $110_2$ (not shown), ..., $110_p$ are terminated in step 469. The Secure Browser(s) $110_1$, $110_2$ (not shown), ..., $110_p$ can be terminated in response to one or more user actions. After terminating the Secure Browser(s) $110_1$, $110_2$ (not shown), ..., $110_p$, step 470 is performed where the decrypted software and/or files associated with the Secure Browser(s) $110_1$, $110_2$ (not shown), ..., $110_p$ are automatically deleted from the client computer. In steps 471 and 472, the Secure Desktop software 314 and the SDS software 320 running on the client computer are terminated. The software 314, 320 can be terminated in response to a user action. Thereafter, the SDS software 320, TSX Core software 312, and TSX Client applications 340 can be optionally disabled or un-installed in step 473. In step 474, the method 400 returns to step 433 of FIG. 4D or subsequent processing is performed.

In view of the forgoing, it should be noted that the TSX Core software 312 is active even when the SDS software 320 is not being used by the user of the client computer. In effect, the client computer is ensured maximum security against malware. Certain security functions (e.g., keylogger protection functions) of the TSX Core software 312 can be disabled or enabled by a user of the client computer at any time.

It should also be noted that the security of data accessed through a network is provided by performing secure domain name resolutions of Internet links and IP addresses. As illustrated by the above described method 400, various secure methods can be employed for domain name resolution. For example, a first secure method generally involves generating DNS requests at a client computer and communicating the DNS requests from the client computer to a secure DNS server computer hosted by the SMS site infrastructure using a fixed IP address for the secure DNS server. The DNS request can be generated at the client computer using a DNS Security Extensions (DNSSEC) protocol, any known authentication method, and/or any known encryption method. DNSSEC protocols are well known to those having ordinary skill in the art, and therefore will not be described herein. A second method generally involves pre-configuring DNS information in one or more configuration files stored on the client computer and accessing the configuration files for the resolution of Internet links and IP addresses. A third method generally involves providing an encrypted link to a DNS server computer of the SMS site using HTTP or HTTPS connections. Embodiments of the present invention are not limited in this regard. Any secure method for domain name resolution can be employed without limitation.

The secure methods employed for domain name resolution can be used in various combinations to provide different security levels. For example, the above described first, second and third secure methods can be applied in various combinations to allow DNS requests to follow standard defined processes for providing no addition security for data accessed through a network. The above described first, second and third secure methods can also be applied in various combinations to enable connections to secure servers using HTTPS for high secure network connections and HTTP for low secured network connections. The HTTPS high secure network connections can be utilized in web based scenarios in which access to sponsored network sites (i.e., network sites associated with organizations participating in the Secure-My-Session service) is desired by a user (not shown) of a client computer. The HTTP low secure network connections can be utilized in web based scenarios in which access to non-sponsored network sites (i.e., network sites associated with organizations that are unwilling to participate in the Secure-My-Session service) is desired by a user (not shown) of a client computer.

Figure 5:
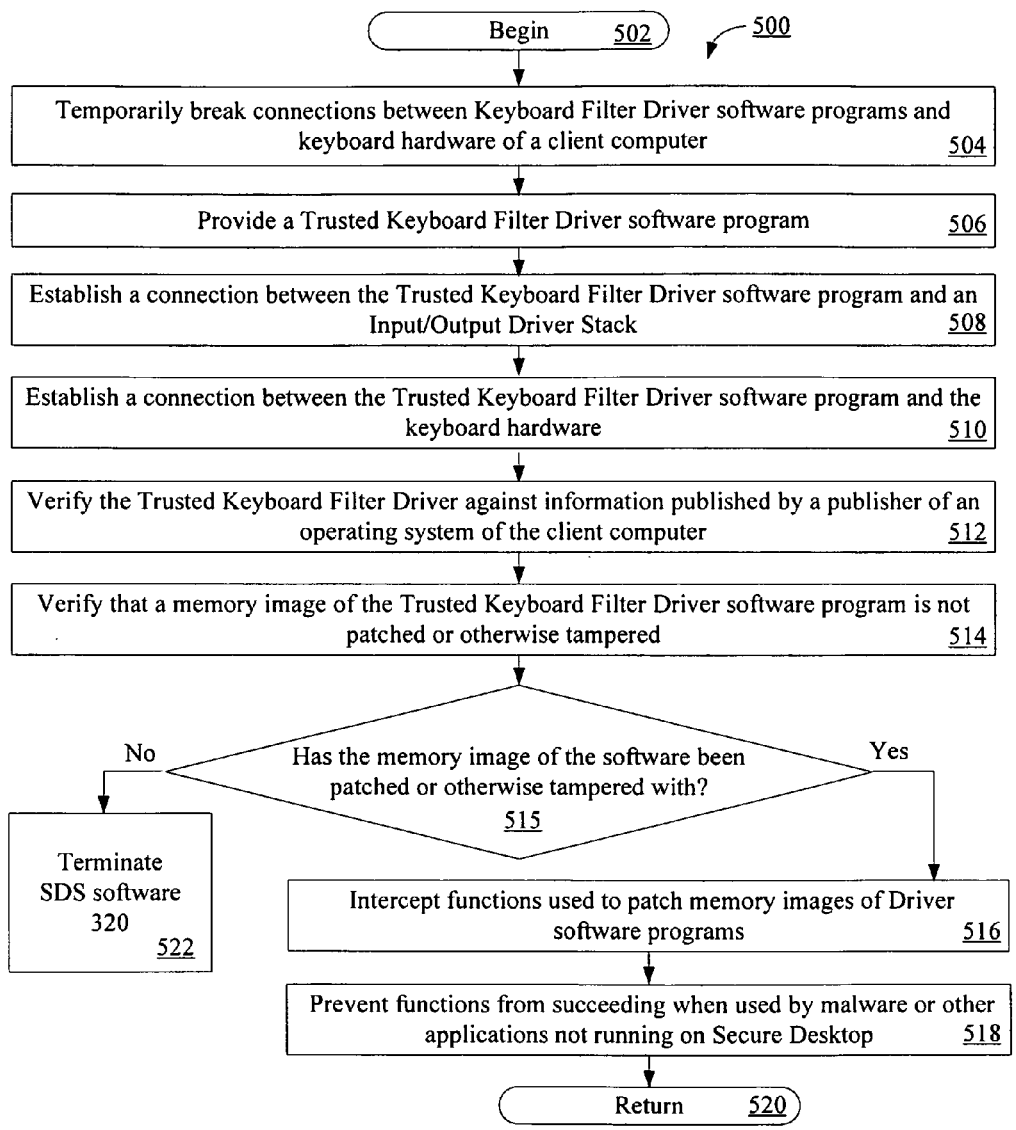
FIG. 5 is a flow diagram of an exemplary method for providing keyboard security feature to the client computer shown in FIG. 1 according to embodiment of the present invention.

Referring now to FIG. 5, there is provided a flow diagram of an exemplary method 500 for providing keyboard security features according to embodiment of the present invention. Notably, the method 500 can be performed in step 455 of FIG. 4F. As shown in FIG. 5, the method 500 begins with step 502 and continues to step 504. In step 504, connections between Keyboard Filter Driver software programs (e.g., the Keyboard Filter Driver software programs $360_1$, $360_2$ (not shown in FIG. 3), . . . , $360_n$ of FIG. 3) and keyboard hardware (e.g., the keyboard hardware 364 shown in FIG. 3) are temporarily broken. Thereafter, a Trusted Keyboard Filter Driver software program (e.g., the Trusted Keyboard Filter Driver software program 362 of FIG. 3) is provided in step 506. Connections are established in step 508 between the Trusted Keyboard Filter Driver software program and an I/O Driver Stack software program (e.g., the I/O Driver Stack software program 366 of FIG. 3). Similarly, connections are established in step 510 between the Trusted Keyboard Filter Driver software program and keyboard hardware.

In step 512, the Trusted Keyboard Filter Driver software program can be verified against information published by a publisher of an operating system of the client computer. If the Trusted Keyboard Filter Driver software program includes information that conflicts with the publisher's information, then the SDS software 320 can be terminated. Similarly in step 514, a memory image of the Trusted Keyboard Filter Driver software program can be verified to determine if it has been patched or otherwise tampered with by comparing memory images of the Trusted Keyboard Filter Driver software program with a disk image of the Trusted Keyboard Filter Driver software program. In addition, a digital signature of the Trusted Keyboard Filter Driver software program can be verified to be intact. Digital signatures of software programs are well known to those having ordinary skill in the art, and therefore will not be described herein. As should be understood, steps 512 and 514 can be performed prior to or subsequent to steps 508 and 510.

Upon completing steps 508-514, the method 500 continues with a decision step 515. If the memory image of the Trusted Keyboard Filter Driver software program has been patched or otherwise tampered with [515:YES], then step 522 is performed where the SDS software 320 is terminated. In contrast, if the memory image of the Trusted Keyboard Filter Driver software program has not been patched or otherwise tampered with [515:NO], then the step 516 is performed. In step 516, functions used to patch memory images of device drivers are intercepted. Thereafter, step 518 is performed where the functions are prevented from succeeding if they are being used by malware or other applications not running on the Secure Desktop. In a next step 520, the method 500 returns to step 502 or subsequent processing is resumed.

Figure 6:
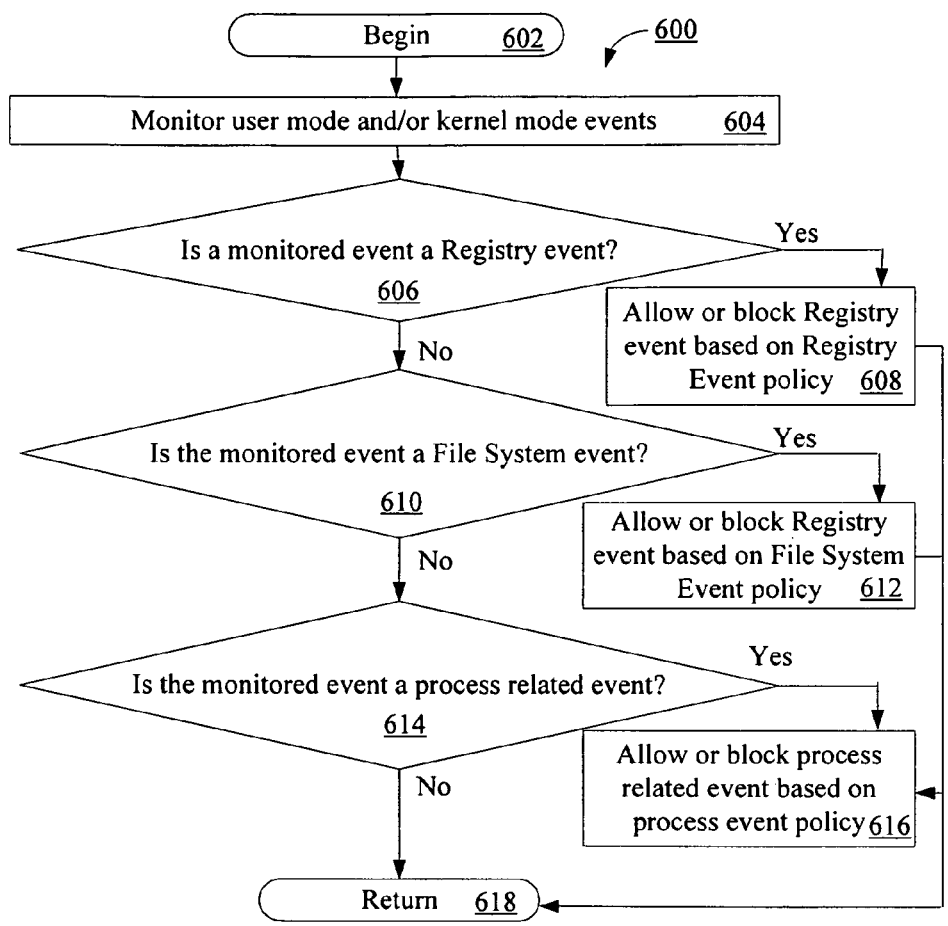
FIG. 6 is a flow diagram of an exemplary method for protecting registry keys and/or files from being modified and/or deleted according to an embodiment of the present invention.

Referring now to FIG. 6, there is provided a flow diagram of an exemplary method 600 for protecting registry keys and/or files from being modified and/or deleted according to an embodiment of the present invention. The method 600 can be performed in step 432 of FIG. 4D and/or in step 465 of FIG. 4G. The method 600 can also be performed at least partially by the TSX Core software 312 of FIG. 3.

As shown in FIG. 6, the method 600 begins with step 602 and continues to step 604. In step 604, user-mode and/or kernel mode events are monitored. If a monitored event is a Registry event [606:YES], then step 608 is performed where the Registry event is allowed or blocked based on a predefined Registry Event policy. The phrase "Registry event", as used herein, refers to events that involve changes in registry keys (e.g., a write event changing a value of a registry key or a delete event deleting a registry key). The phrase "Registry Event policy", as used herein, refers to a pre-defined rule to be applied to one or more registry keys as enumerated in a policy that is being accessed by software running on a computer system (e.g., the client computer). Subsequent to allowing or blocking the Registry event, step 618 is performed where the method returns to step 602 or subsequent processing is performed. If a monitored event is not a Registry event [606:NO], then a decision step 610 is performed for determining if the monitored event is a File System event.

If the monitored event is a File System event [610:YES], then step 612 is performed where the File System event is allowed or blocked based on a predefined File System Event policy. The phrase "File System event", as used herein, refers to events that involve changes in files (e.g., a write event modifying a file or a delete event deleting a file). The phrase "File System Event policy", as used herein, refers to a pre-defined rule to be applied to one or more files as enumerated in a policy that is being accessed by software running on a computer system (e.g., a pre-defined rule allows read operations, block write operation, or delete operations). Thereafter, step 618 is performed where the method 600 returns to step 602 or subsequent processing is resumed.

If the monitored event is not a File System event [610:NO], then step 614 is performed where a decision is made as to whether the monitored event is a process related event. If the monitored event is a process related event [614:YES], then step 616 is performed. Step 616 involves allowing or blocking process related events based on process event policy. Upon completing step 616, step 618 is performed where the method 600 returns to step 604 or subsequent processing is resumed. If the monitored event is not a process related event [614:NO], then the method 600 returns to step 602 or subsequent processing is resumed.

Figure 7:
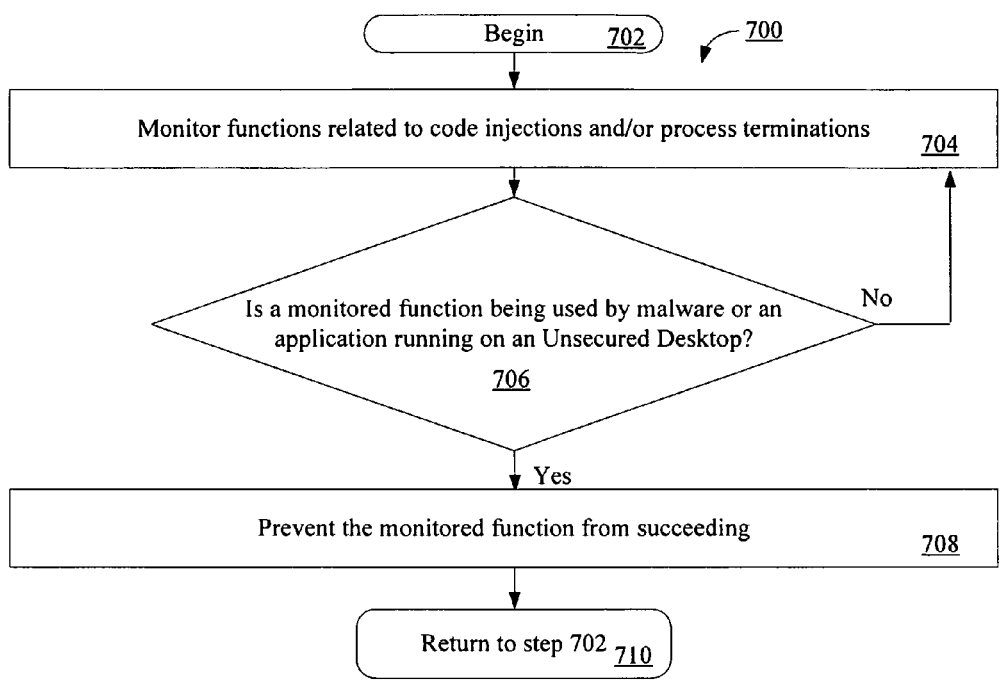
FIG. 7 is a flow diagram of an exemplary method for preventing code from being injected into a running Secure browser and/or a running Secure Desktop Solution (SDS) Client Application according to an embodiment of the present invention.

Referring now to FIG. 7, there is provided a flow diagram of an exemplary method 700 for preventing code from being injected into a running Secure Browser and/or a running SDS Client Application according to an embodiment of the present invention. The method 700 can be performed in step 432 of FIG. 4D and/or step 466 of FIG. 4G. The method 700 can also be performed by the TSX Core software 312 of FIG. 3.

As shown in FIG. 7, the method 700 begins with step 702 and continues to step 704. In step 704, functions related to code injections and/or process terminations are monitored. These functions are well known to those having ordinary skill in the art, and therefore will not be described in detail herein. However, it should be understood that the code injection functions can include, but are not limited to, Structured Query Language (SQL) code injection functions to arbitrarily modify stored data, exploitation functions to exploit code injection vulnerabilities in web browsers and/or web browser plug-ins when a user of a client computer visits a malicious network site, and exploitation functions to exploit shell injection vulnerabilities in a service (e.g., services 306 of FIG. 3), and Hyper Text Markup Language/Script injection functions to steal sessions and/or cookies from web browsers.

Subsequent to step 704, a decision step 706 is performed where a determination is made as to whether a monitored function is being used by malware or an application running on an Unsecured Desktop. This determination is made by the TSX Core software 312 which tracks the monitored functions through interception methods and access origin verification methods when software on a client computer tries to use the monitored functions. An access origin verification method can generally involve tracing back into a process by reversing on a path of software that is trying to use the monitored functions of an operating system. For example, a caller points to a process in memory and a process in memory points to a disk image. The disk image points to a publisher if it is an authentic program (not malware). Malware typically does not refer to a publisher. Accordingly, if a disk image does not point to a publisher, then the monitored function is deemed to be a monitored function being used by malware.

If the monitored function is not being used by malware or an application running on an Unsecured Desktop (e.g., the Unsecured Desktop 902 shown in FIG. 9) [706:NO], then step 704 is performed again. If the monitored function is being used by malware or an application running on an Unsecured Desktop (e.g., the Unsecured Desktop 902 shown in FIG. 9) [706:YES], then step 708 is performed where the monitored function is prevented from succeeding. Thereafter, step 710 is performed where the method 700 returns to step 702 or subsequent processing is resumed.

Figure 8:
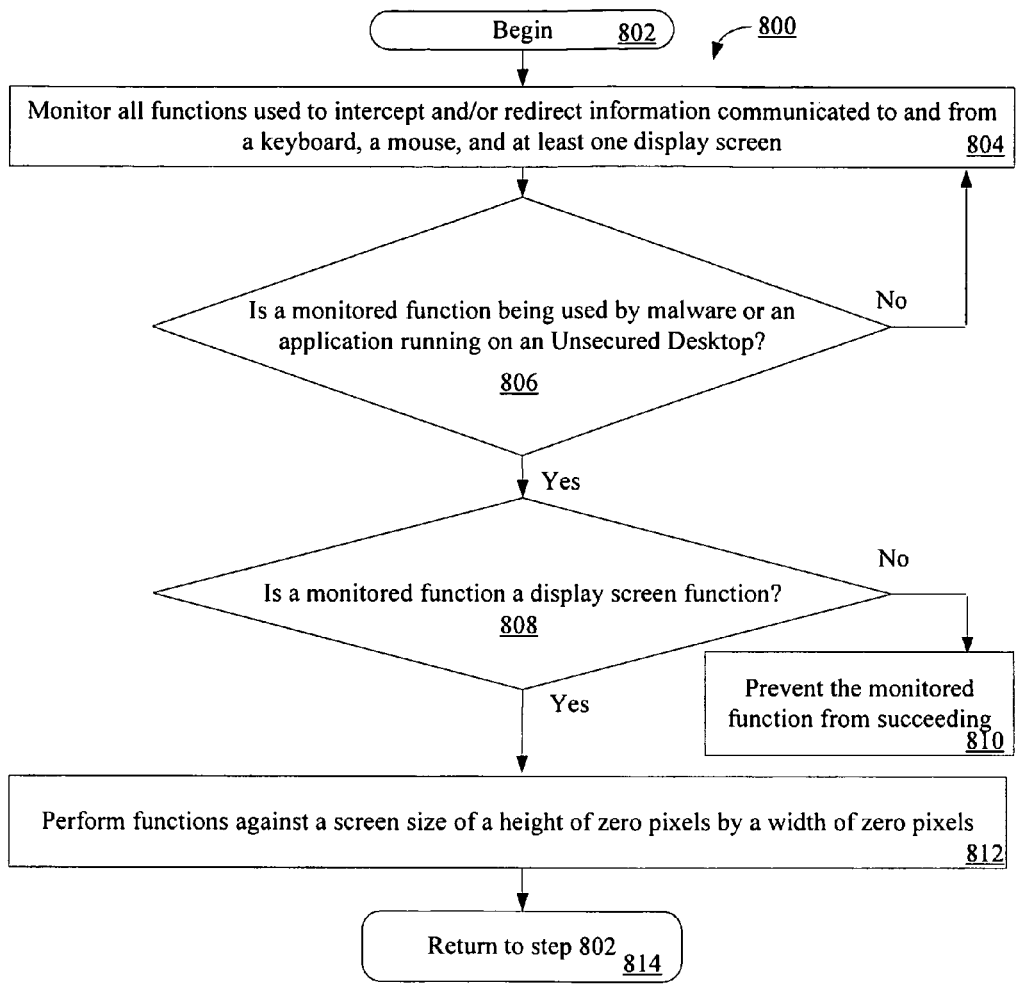
FIG. 8 is a flow diagram of an exemplary method for preventing screen scrapers from capturing information displayed on a Secure Desktop according to an embodiment of the present invention.

Referring now to FIG. 8, there is provided a flow diagram of an exemplary method 800 for preventing screen scrapers from capturing information displayed on a Secure Desktop according to an embodiment of the present invention. The method 800 can be performed in step 432 of FIG. 4D and/or step 467 of FIG. 4G. The method 700 can also be performed by the TSX Core software 312 of FIG. 3.

As shown in FIG. 8, the method 800 begins with step 802 and continues to step 804. In step 804, all functions used to intercept and/or redirect information communicated to and from certain hardware is monitored. These functions are well known to those having ordinary skill in the art, and therefore will not be described herein. However, it should be understood that the code injection functions can include, but are not limited to, I/O interception functions and I/O redirection functions. The hardware can include, but is not limited to, a keyboard (not shown in FIG. 2), a mouse (not shown in FIG. 2), and a display screen (e.g., the display screen 204 of FIG. 2).

Subsequent to completing step 804, the method 800 continues with a decision step 806 where a determination is made as to whether a monitored function is being used by malware or an application running on an Unsecure Desktop. This determination is made by the TSX Core software 312 which tracks the monitored functions through interception methods and access origin verification methods when software on a client computer tries to use the monitored functions. If a monitored function is being used by malware or an application running on an Unsecure Desktop (e.g., the Unsecure Desktop 902 of FIG. 9) [806:YES], then the method 800 continues with a decision step 808. In contrast, if the monitored function is not being used by malware or an application running on an Unsecure Desktop [806:NO], then step 804 is performed again.

The decision step 808 involves determining if the monitored function is a display screen function. This determination is made by the TSX Core software 312 which tracks the monitored display screen functions through interception methods and access origin verification methods when software on a client computer tries to use the monitored display screen functions. The display screen functions can include, but are not limited to, print screen functions, save screen to clipboard functions, and copy screen to remote desktop functions. If the monitored function is not a display screen function [808:NO], then step 810 is performed where the monitored function is prevented from succeeding. If the monitored function is a display screen function [808:YES], then step 812 is performed. In step 812, the display screen function is performed against a screen size of a height of zero (0) pixels by a width of zero (0) pixels. Accordingly, the display screen appears to a screen scraping means as being absent of displayed data. In effect, the screen scraping means has been effectively disabled. Upon completing step 812, step 814 is performed where the method 800 returns to step 802 or subsequent processing is resumed.

In light of the forgoing description of the invention, it should be recognized that the present invention can be realized in hardware, software, or a combination of hardware and software. A method for providing a trusted secure desktop according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for protecting data accessed through a network connection, comprising:
    transferring security software from an external memory device of a client computer to an internal memory device of the client computer that is operative to protect data communicated to and from the client computer via at least one communications link by providing at least one web browser which executes in user mode on a trusted secure desktop operative to run simultaneously with an unsecure desktop of the client computer;
    activating said security software; and
    in response to an activation of said security software, preventing said unsecure desktop from acting as a launching point for all software applications that are not currently running during a remaining period of time in which said security software and said unsecure desktop continue to simultaneously execute;
    wherein said trusted secure desktop is configured to enable data protection in user mode and kernel mode, and the security software includes at least one service selected from the group consisting of a keylogger prevention service, a code injection prevention service, a process protection service and a screen scraper protection service;
    wherein the screen scraper protection service is provided by
        monitoring a plurality of functions performed by the client computer used to intercept or redirect information communicated to and from a keyboard, a mouse and a display screen,
        intercepting the plurality of functions, and
        preventing at least one function of the plurality of functions from succeeding if the function is a non-display screen function and is determined to be used by malware.

2. The method according to claim 1, wherein the security software is further operative to protect the data communicated to and from the client computer via the communications link by providing at least one security service to the web browser, where the security service includes at least one service selected from the group consisting of a keylogger prevention service, a code injection prevention service, a process protection service, and a screen scraper protection service.

3. The method according to claim 2, wherein the security service is provided by the trusted secure desktop, an underlying user mode software operative to communicate with the trusted secure desktop, and an underlying kernel mode software operative to communicate with the underlying user mode software and an operating system of the client computer.

4. The method according to claim 2, wherein the keylogger prevention service is provided by:
    temporarily breaking all connections between an operating system of the client computer and a plurality of first keyboard device drivers of the client computer; and
    establishing a connection between the operating system and a second keyboard device driver that has been verified to be an unpatched or untampered keyboard device driver.

5. The method according to claim 4, wherein the keylogger prevention service is further provided by:
    intercepting at least one function used to patch memory images of the second keyboard device driver; and
    preventing the function from succeeding if the function is determined to be used by malware.

6. The method according to claim 2, wherein the code injection prevention service is provided by:
    monitoring a plurality of code injection functions being performed by the client computer; and
    preventing at least one code injection function of the plurality of code injection functions from succeeding if the code injection function is determined to be used by malware.

7. The method according to claim 1, further comprising establishing a first secure communications link between the client computer and a first network site system provided by a first business organization offering a network based service for protecting the data accessed through the network connection.

8. The method according to claim 7, further comprising establishing a second secure communications link between the client computer and a second network site system provided by a second business organization different from the first business organization.

9. The method according to claim 8, further comprising encrypting data prior to being communicated to and from the first network site system, the second network site system, and the client computer via a respective one of the first and second secure communication links.

10. The method according to claim 1, further comprising:
receiving a domain name resolution request at a first network site system for obtaining a secure numerical identifier associated with networking equipment of a second network site system, the domain name resolution request being generated at the client computer;
performing a domain name resolution at the first network site system to translate a domain name to the secure numerical identifier associated with the networking equipment for purposes of locating and addressing the networking equipment; and
communicating the secure numerical identifier to the client computer over a secure communications link established between the first network site system and the client computer.

11. The method according to claim 10, further comprising encrypting the secure numerical identifier prior to communicating the secure numerical identifier from the first network site system to the client computer.

12. The method according to claim 1, further comprising accessing a configuration file stored in the internal memory device of the client computer including domain-name-to-secure-numerical-identifier resolution information;
obtaining a secure numerical identifier from the configuration file;
generating a resource request at the client computer for a resource of a network site system using the secure numerical identifier; and
communicating the resource request from the client computer to the network site system via a secure communications link.

13. The method according to claim 1, further comprising creating a user profile identifying at least one network site system to which a user of the client computer wants to securely link and exchange information with.

14. The method according to claim 1, further comprising storing the web browser on the client computer in an encrypted form and decrypting the web browser prior to executing the web browser on the trusted secure desktop.

15. The method according to claim 1, further comprising defining a landing page of the web browser to be a predefined site.

16. The method according to claim 1, further comprising providing a mini-stack application operative to display a borderless browser window on a display screen of the client computer including an element facilitating a user-software interaction for establishing a secure communications link between the client computer and at least one network site.

17. The method according to claim 16, wherein the mini-stack application is protected at least by an underlying user and kernel mode software against tampering by hackers and malware.

18. The method according to claim 1, further comprising:
gathering information including software usage information, network site selection information, and advertisement information identifying advertisements clicks on by a user of the client computer; and
storing the gathered information in a storage device of a network system site.

19. A method for protecting data accessed through a network connection, comprising:
transferring security software from an external memory device of a client computer to an internal memory device of the client computer that is operative to protect data communicated to and from the client computer via at least one communications link by providing at least one web browser which executes in user mode on a trusted secure desktop operative to run simultaneously with an unsecure desktop of the client computer;
wherein the security software is further operative to protect the data communicated to and from the client computer via the communications link by providing at least one security service to the web browser, where the security service includes at least one service selected from the group consisting of a keylogger prevention service, a code injection prevention service, a process protection service, and a screen scraper protection service;
wherein the screen scraper protection service is provided by
monitoring a plurality of functions performed by the client computer used to intercept or redirect information communicated to and from a keyboard, a mouse, and a display screen,
intercepting the plurality of functions, and
preventing at least one function of the plurality of functions from succeeding if the function is a non-display screen function and is determined to be used by malware.

20. A method for protecting data accessed through a network connection, comprising:
transferring security software from an external memory device of a client computer to an internal memory device of the client computer that is operative to protect data communicated to and from the client computer via at least one communications link by providing at least one web browser which executes in user mode on a trusted secure desktop operative to run simultaneously with an unsecure desktop of the client computer;
wherein the security software is further operative to protect the data communicated to and from the client computer via the communications link by providing at least one security service to the web browser, where the security service includes at least one service selected from the group consisting of a keylogger prevention service, a code injection prevention service, a process protection service, and a screen scraper protection service;
wherein the screen scraper protection service is provided by
monitoring a plurality of functions performed by the client computer used to intercept or redirect information communicated to and from a keyboard, a mouse, and a display screen,
intercepting the plurality of functions, and
performing the function against a screen size of a height of zero pixels and a width of zero pixels if the function is a display screen function and is determined to be used by malware.

21. A method for protecting data accessed through a network connection, comprising:
transferring security software from an external memory device of a client computer to an internal memory device of the client computer that is operative to protect data communicated to and from the client computer via at least one communications link by providing at least one web browser which executes in user mode on a trusted secure desktop operative to run simultaneously with an unsecure desktop of the client computer;
scanning program data stored in the internal memory device of the client computer associated with a plurality of user mode and kernel mode applications running on the unsecure desktop for malware prior to launching the trusted secure desktop;

preventing at least one of the trusted secure desktop and the web browser from launching if the program data includes malware;

allowing the trusted secure desktop and the web browser to launch if the program data does not include malware;

in response to an activation of said trusted secure desktop, preventing the unsecure desktop from acting as a launching point for all software applications that are not currently running during a remaining period of time in which said security software and said unsecure desktop continue to simultaneously execute;

wherein the security software includes at least one service selected from the group consisting of a keylogger prevention service, a code injection prevention service, a process protection service and a screen scraper protection service;

wherein the screen scraper protection service is provided by monitoring a plurality of functions performed by the client computer used to intercept or redirect information communicated to and from a keyboard, a mouse and a display screen, intercepting the plurality of functions, and preventing at least one function of the plurality of functions from succeeding if the function is a non-display screen function and is determined to be used by malware.

22. The method according to claim 21, further comprising running an anti-virus/spyware software on the unsecure desktop to identify and remove the malware from the client computer; and allowing the trusted secure desktop and the web browser application to be launched subsequent to the removal of the malware from the client computer.

23. A network based system for protecting data accessed by a computer system through a network connection, comprising:

a first network site system offering a network based service for protecting the data accessed through the network connection, the first network site system configured to transfer security software from a first memory device of the first network site to a second memory device of a client computer, the security software being operative to protect data communicated to and from the client computer via a communications link;

wherein the security software includes a web browser which executes in user mode on a trusted secure desktop operative to run simultaneously with an unsecure desktop of the client computer, said trusted secure desktop configured to enable data protection in user mode and kernel mode;

wherein said unsecure desktop is prevented from acting as a launching point for all software applications that are not currently running during a period of time in which said security software and said unsecure desktop simultaneously execute; and wherein the security software includes at least one service selected from the group consisting of a keylogger prevention service, a code injection prevention service, a process protection service and a screen scraper protection service;

wherein the screen scraper protection service is provided by monitoring a plurality of functions performed by the client computer used to intercept or redirect information communicated to and from a keyboard, a mouse and a display screen, intercepting the plurality of functions, and preventing at least one function of the plurality of functions from succeeding if the function is a non-display screen function and is determined to be used by malware.

24. The network based system according to claim 23, wherein the security software protects the data communicated to and from the client computer via the communications link by performing at least one security service operation to protect the web browser from malware, where the security service operation includes at least one operation selected from the group consisting of a keylogger prevention operation, a code injection prevention operation, and a screen scraper protection operation.

25. The network based system according to claim 24, wherein the security service is provided by the trusted secure desktop, an underlying user mode software operative to communicate with the trusted secure desktop, and an underlying kernel mode software operative to communicate with the underlying user mode software and an operating system of the client computer.

26. The network based system according to claim 24, wherein the keylogger prevention operation involves:

temporarily breaking all connections between an operating system of the client computer and a plurality of first keyboard device drivers of the client computer; and establishing a connection between the operating system and a second keyboard device driver that has been verified to be an unpatched or untampered device driver.

27. The network based system according to claim 26, wherein the keylogger prevention operation further involves:

intercepting at least one function used to patch memory images of the second keyboard device driver; and preventing the function from succeeding if the function is determined to be used by malware.

28. The network based system according to claim 24, wherein the code injection prevention operation involves:

monitoring a plurality of code injection functions performed by the client computer; and preventing at least one code injection function of the plurality of code injection functions from succeeding if the code injection function is determined to be used by malware.

29. The network based system according to claim 23, wherein the first network site system is further configured for establishing a first secure communications link with the client computer, and establishing a second secure communications link between the client computer and a second network site system.

30. The network based system according to claim 29, wherein data is encrypted prior to being communicated to and from the first network site systems, the second network site systems, and the client computer via a respective one of the first and second secure communications links.

31. The network based system according to claim 29, wherein the second network site system is selected from a secure index or directory provided by the first network site system.

32. The network based system according to claim 29, wherein the second network site system is a banking network site system, a law firm intranet network site system, a government intranet network site system, a stock trading network site system, or a social data exchange network site system.

33. The network based system according to claim 23, wherein the first network site system is further configured for
receiving a domain name resolution request from the client computer for obtaining a secure numerical identifier associated with networking equipment of a second network site system different from the first network site system;
performing a domain name resolution to translate a domain name to the secure numerical identifier associated with the networking equipment for purposes of locating and addressing the networking equipment; and
communicating the secure numerical identifier to the client computer over a secure communications link established between the first network site system and the client computer.

34. The network based system according to claim 33, wherein the first network site system is further configured for encrypting the secure numerical identifier prior to communicating the secure numerical identifier to the client computer.

35. The network based system according to claim 23, wherein the first network site system is further configured for transferring a configuration file from the first memory device to the second memory device of the client computer including domain-name-to-secure-numerical-identifier resolution information.

36. The network based system according to claim 23, wherein the first network site system is further configured for generating a user profile identifying at least one network site system to which a user of the client computer wants to securely link and exchange information with.

37. The network based system according to claim 23, wherein the first network site system is further configured for encrypting the web browser prior to transferring the security software to the client computer.

38. A network based system for protecting data accessed by a computer system through a network connection, comprising:
a first network site system offering a network based service for protecting the data accessed through the network connection, the first network site system configured for transferring security software from a first memory device of the first network site to a second memory device of a client computer, the security software being operative to protect data communicated to and from the client computer via a communications link;
wherein the security software includes a web browser which executes in user mode on a trusted secure desktop operative to run simultaneously with an unsecure desktop of the client computer;
wherein the security software protects the data communicated to and from the client computer via the communications link by performing at least one security service operation to protect the web browser from malware, where the security service operation includes at least one operation selected from the group consisting of a keylogger prevention operation, a code injection prevention operation, and a screen scraper protection operation;
wherein the screen scraper protection operation involves
monitoring a plurality of functions performed by the client computer used to intercept or redirect information communicated to and from a keyboard, a mouse, and a display screen,
intercepting the plurality of functions, and
preventing at least one function of the plurality of functions from succeeding if the function is a non-display screen function and is determined to be used by malware.

39. A network based system for protecting data accessed by a computer system through a network connection, comprising:
a first network site system offering a network based service for protecting the data accessed through the network connection, the first network site system configured for transferring security software from a first memory device of the first network site to a second memory device of a client computer, the security software being operative to protect data communicated to and from the client computer via a communications link;
wherein the security software includes a web browser which executes in user mode on a trusted secure desktop operative to run simultaneously with an unsecure desktop of the client computer;
wherein the security software protects the data communicated to and from the client computer via the communications link by performing at least one security service operation to protect the web browser from malware, where the security service operation includes at least one operation selected from the group consisting of a keylogger prevention operation, a code injection prevention operation, and a screen scraper protection operation;
wherein the screen scraper protection operation involves
monitoring a plurality of functions performed by the client computer used to intercept or redirect information communicated to and from a keyboard, a mouse, and a display screen,
intercepting the plurality of functions, and
performing the function against a screen size of a height of zero pixels and a width of zero pixels if the function is a display screen function and is determined to be used by malware.

40. A network based system including at least one client computer, comprising:
at least one server computer provided by a first business organization offering a network based service for protecting data accessed through a network connection, the server computer configured to
communicate with the client computer via a first secure communication link established between the server computer and the client computer,
perform a domain name resolution to translate a domain name to a secure numerical identifier associated with a second network site system provided by a second business organization different from the first business organization for purposes of locating and addressing the second network site system,
communicate the secure numerical identifier to the client computer over the first secure communication link, and
facilitate a second secure communications link between the client computer and the second network site system;
wherein said second secure communications link is facilitated by security software providing a trusted secure desktop that is (a) operative to run simultaneously with an unsecure desktop of a computing system and (b) configured to enable data protection in a user mode and a kernel mode of said computing system;
wherein said unsecure desktop is prevented from acting as a launching point for all software applications that are not currently running during a period of time in which said security software and said unsecure desktop simultaneously execute;
wherein the security software includes at least one service selected from the group consisting of a keylogger prevention service, a code injection prevention service, a process protection service and a screen scraper protection service; and wherein the screen scraper protection service is provided by
- monitoring a plurality of functions performed by the client computer used to intercept or redirect information communicated to and from a keyboard, a mouse and a display screen,
- intercepting the plurality of functions, and
- preventing at least one function of the plurality of functions from succeeding if the function is a non-display screen function and is determined to be used by malware.

41. The network based system according to claim 40, wherein the server computer is further configured to
- receive a security software download request from the client computer, and
- responsive to the security software download request, obtain files for the security software and communicate the files to the client computer;
- wherein the security software includes at least one web browser which executes in user mode on a trusted secure desktop.

* * * * *